(12) United States Patent
Graber et al.

(10) Patent No.: US 10,397,495 B1
(45) Date of Patent: Aug. 27, 2019

(54) SELF-CONTAINED MOBILE SENSOR CALIBRATION STRUCTURE

(71) Applicant: Amazon Technologies, Inc., Seattle, WA (US)

(72) Inventors: Sarah Graber, Seattle, WA (US); Martin Koestinger, Graz (AT); Barry James O'Brien, Seattle, WA (US); Gerald Schweighofer, Feistitiztal (AT); Mario Sormann, Graz (AT); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 15/426,685

(22) Filed: Feb. 7, 2017

(51) Int. Cl.
| | |
|---|---|
| *B64F 5/60* | (2017.01) |
| *H04N 5/28* | (2006.01) |
| *B64C 39/02* | (2006.01) |
| *B64D 47/08* | (2006.01) |
| *B64F 1/00* | (2006.01) |
| *B64F 1/24* | (2006.01) |
| *H04N 17/00* | (2006.01) |

(52) U.S. Cl.
CPC ............ *H04N 5/28* (2013.01); *B64C 39/024* (2013.01); *B64D 47/08* (2013.01); *B64F 1/005* (2013.01); *B64F 1/24* (2013.01); *B64F 5/60* (2017.01); *H04N 17/002* (2013.01)

(58) Field of Classification Search
CPC ..... H04N 5/28; B64F 5/60; B64F 1/24; B64C 39/024; B64D 47/08
See application file for complete search history.

(56) References Cited

U.S. PATENT DOCUMENTS

| | | | | |
|---|---|---|---|---|
| 9,952,317 | B2 * | 4/2018 | Valois | G01S 7/497 |
| 2016/0143626 | A1 * | 5/2016 | Ohta | G16H 40/67 |
| | | | | 600/437 |
| 2016/0223357 | A1 * | 8/2016 | Frey, Jr. | G01C 25/005 |
| 2016/0245899 | A1 * | 8/2016 | Rybski | G01S 7/4004 |
| 2016/0376031 | A1 * | 12/2016 | Michalski | B64C 39/024 |
| | | | | 701/15 |
| 2017/0328513 | A1 * | 11/2017 | Davis | F16B 2/20 |
| 2018/0002017 | A1 * | 1/2018 | Abeles | B64F 5/60 |

* cited by examiner

*Primary Examiner* — Richard G Davis
(74) *Attorney, Agent, or Firm* — Lee & Hayes, P.C.

(57) ABSTRACT

A mobile calibration room may be used for calibrating one or more sensors used on unmanned aerial vehicles (UAVs). A system can include folding or collapsible walls to enable the system to be moved between a stowed position and a deployed position. In the deployed position, the system can comprise a calibration room including one or more 2D or 3D targets used to calibrate one or more sensors (e.g., cameras) on a UAV. The system can include a turntable to rotate the UAV about a first axis during calibration. The system can also include a cradle to rotate the UAV around, or translate the UAV along, a second axis. The turntable can include a frame to rotate the UAV around a third axis during calibration. The mobile calibration room can be coupled to a vehicle to enable the mobile calibration room to be moved between locations.

20 Claims, 17 Drawing Sheets

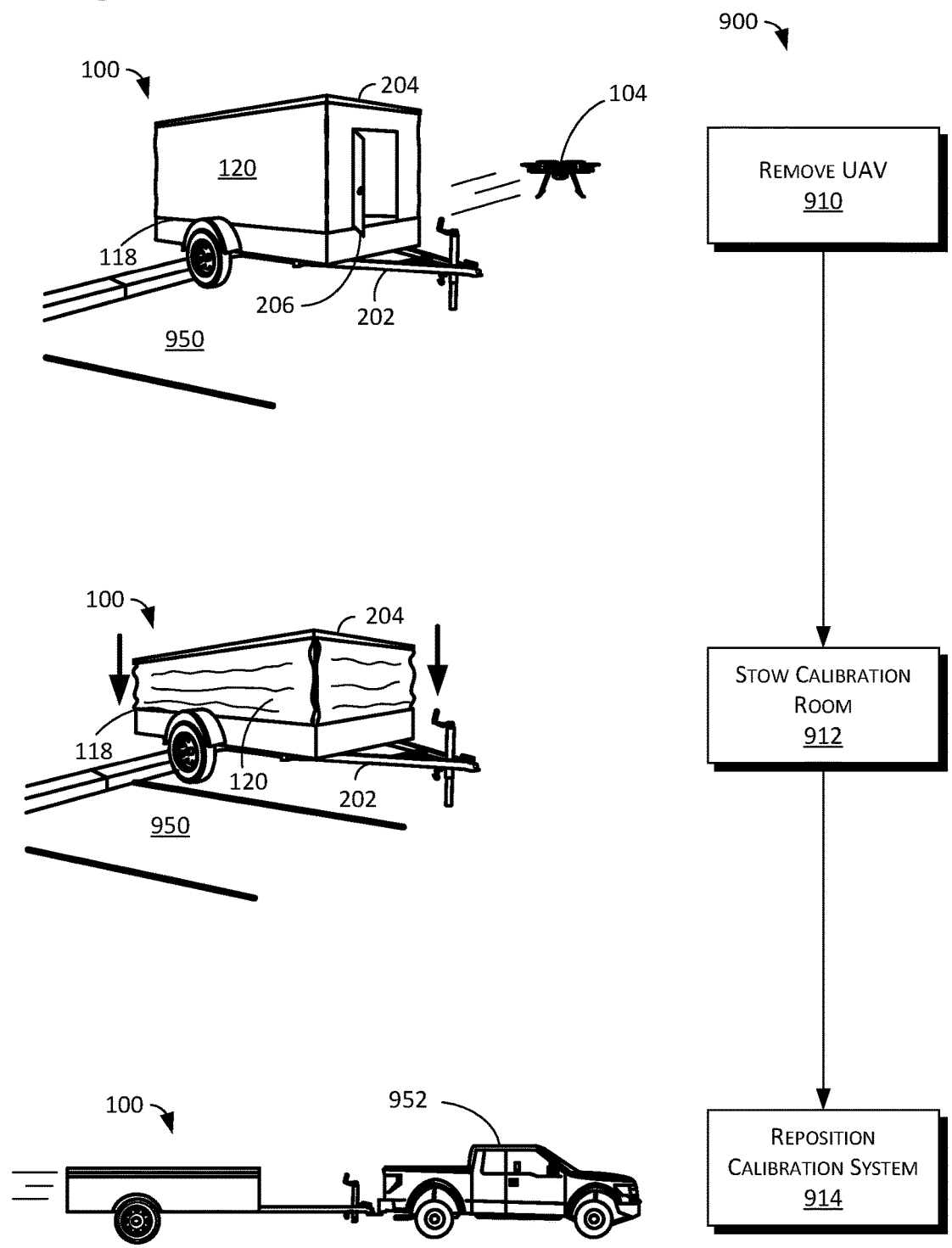

SELF-CONTAINED MOBILE SENSOR CALIBRATION STRUCTURE

BACKGROUND

Home delivery for many products is available in a wide variety of locations. The proliferation of the internet and online retailers, for example, means that users can order everything from televisions to groceries online (or on the phone). In many cases, these items can be delivered within a day or two, or sometimes even within a couple of hours.

Many items can be delivered by an unmanned aerial vehicle (UAV) directly to a landing area proximate the delivery location. UAVs can be programmed to navigate to a particular location (e.g., GPS coordinates), locate a target or landing zone, and land in, or drop packages in, the landing zone. The UAVs can utilize data from a variety of sensors to affect these deliveries.

To navigate between the various locations, it may be desirable to periodically calibrate one or more of the sensors, such as the cameras or GPS sensors on the UAV. Using conventional methods, calibration can be time consuming, however, and generally requires a large amount of dedicated space. Traditional calibrations procedures for cameras, for example, use a relatively large, fixed calibration room to move past the cameras for calibration. The output from these cameras can then be recorded using an external device (e.g., a laptop computer or handheld scanner), analyzed, and external calibration software can provide a calibration solution for the various cameras and sensors on the UAV.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 9A-9B are flowcharts depicting an example of a method for using the mobile calibration system, in accordance with some examples of the present disclosure.

DETAILED DESCRIPTION

Figure 1:
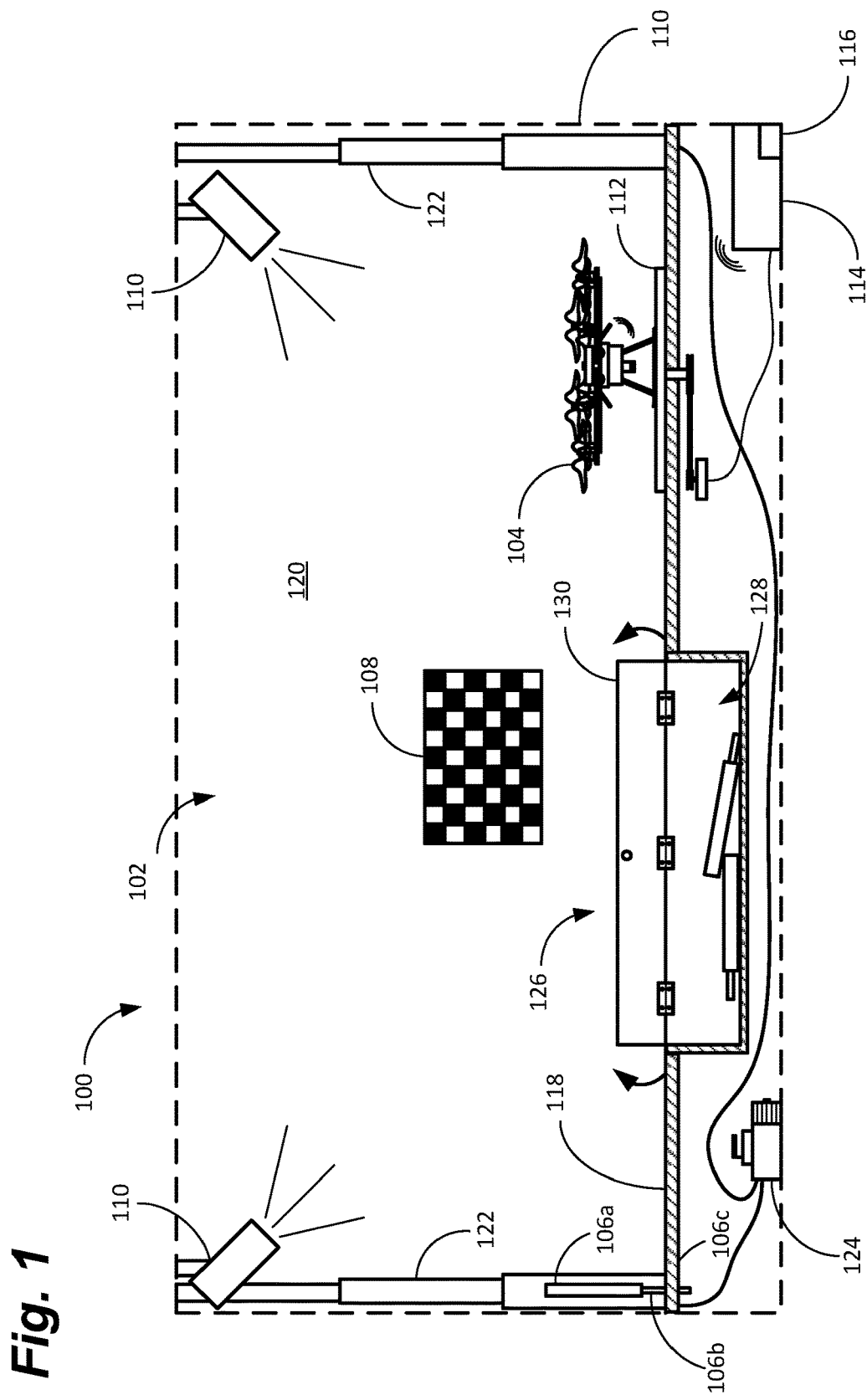
FIG. 1 depicts a cross-sectional view of a mobile calibration system, in accordance with some examples of the present disclosure.

Examples of the present disclosure are related to systems and methods for calibrating various sensors on unmanned aerial vehicles (UAVs). The system can be portable to enable it to be used at multiple locations without the need for large infrastructure investments. The system can include a number of fixed or moving targets to enable one or more sensors on the UAV to be calibrated. In some examples, the system can include a turntable, or other element, to rotate the UAV around a first axis during calibration. In some examples, the system can also include a frame to rotate the turntable or the UAV around a second axis during calibration. Introducing additional motion to the calibration process can improve calibration accuracy and reduce calibration time.

The systems, apparatuses, and methods described herein are described in terms of a mobile calibration system for UAVs. In some examples, the mobile calibration system can comprise a trailer to facilitate moving the system with a vehicle, for example. One of skill in the art will realize, however, that the disclosure is not so limited. The trailer could instead be a vehicle (e.g., a box van), for example, with the calibration room disposed in the box. The system could also be small and light enough to be hand-carried. Similarly, while discussed below with reference to a turntable and a frame, the system can also use different mechanisms to move the UAVs and/or moving targets to achieve the same, or similar, results. Thus, in this regard, the disclosure is intended to be purely illustrative and not limiting.

As mentioned above, UAVs can be used to deliver packages and perform other tasks by flying between various locations. To affect these flights, the UAVs can use data from a plurality of sensors including, for example, global positioning system (GPS) sensors, imaging devices (e.g., video and still cameras), digital compasses, accelerometers, and proximity sensors. A UAV may be based at a warehouse, for example, and deliver packages from the warehouse to a variety of customer locations using addresses, GPS coordinates, and/or other information.

To accurately navigate between the warehouse and the customer locations, however, it may be desirable to periodically calibrate one or more of the sensors, such as the cameras, on the UAV. Using conventional methods, calibration can be time consuming, however, and generally requires a large amount of space. Traditional calibrations procedures for cameras, for example, use a relatively large, fixed room to move two-dimensional (2D) or three-dimensional (3D) targets through space relative to the cameras. The output from these cameras can then be recorded using an external device (e.g., a laptop computer), analyzed, and a calibration software can provide a calibration solution for the various cameras on the UAV. This calibration solution, in turn, can be used by the UAVs onboard video and navigation software.

To reduce labor and space requirements, however, it may be desirable to have a more portable and automated process. A portable, collapsible calibration room, for example, can enable a single piece of equipment to be used in multiple locations, obviating the need for infrastructure investments in large, fixed calibration rooms at each location (e.g., each warehouse). Appropriately selected equipment and software onboard the UAV can also enable semi- or fully-autonomous calibration reducing labor costs. It is to such systems and methods that examples of the present disclosure are primarily directed.

The techniques, apparatuses, and systems described herein may be implemented in a number of ways. Example implementations are provided below with reference to the following figures.

As shown in cross-section in FIG. 1, the system 100 can comprise a mobile calibration room 102 capable of housing one or more different types of UAVs 104. The system 100 can be mounted on a number of platforms including, but not limited to, a trailer or vehicle, or can be hand carryable. In some examples, the system 100 can also comprise one or more 2D or 3D targets 106, 108, one or more light sources 110, and a turntable 112. The system 100 can also comprise a controller 114 to enable users and/or the UAV 104 to control one or more components in the calibration room 102.

As discussed in more detail below with reference to FIG. 5 and, the UAV 104 can comprise one or more cameras, cameras, or pairs of cameras, which can be used for navigation, obstacle detection and avoidance, and location identification, among other things. In some examples, the cameras can include one or more pairs of stereoscopic cameras with each pair facing in a different direction. In some examples, this can provide a substantially 360 degree view around the UAV 104. In some examples, the UAV 104 can also comprise a downward-looking and/or upward facing camera. The cameras can comprise still or video cameras and can include night-vision, infrared, thermal imaging, and other technologies. It can be useful, however, to calibrate the cameras from time to time.

The cameras can be calibrated by moving targets 106, 108 past the field of view of the cameras, or vice-versa (i.e., moving the cameras past the targets 106, 108). The cameras can be calibrated individually to determine various inherent parameters of the cameras (e.g., focal length, field of view, lens distortion, etc.). The cameras can also be calibrated in stereoscopic pairs to identify any differences between the cameras and to calculate the parallax between the cameras, which can be used for distance estimations, among other things. Finally, in some examples, the cameras can be calibrated as a whole ("platform" calibration) to provide an overall video profile for the UAV 104.

To this end, the system 100 can include at least one or more targets 106, 108 and a turntable 112. In some examples, the targets 106 can be affixed to the floor 118 of the system 100. As shown, the target 106 can comprise a target body 106a and a post 106b. In this configuration, the post 106b can be placed in a designated hole 106c in the floor 118, for example. This can enable the target 106 to be repeatably placed in the calibration room 102, for example, at a predetermined distance, di, from the turntable 112. In other words, placing the target 106 in the designated hole can position the target 106 at a predetermined distance (e.g., 1 or 2 meters) and/or height from the turntable 112 (and thus, the UAV 104). For repeatability of camera calibration, it may be useful to have known targets 106, 108 in known locations.

In other examples, the targets 108 can be attached to the walls 120 of the calibration room 102. The targets 108 can be affixed to the walls 120 using Velcro®, for example, to enable the targets 108 to be removed during transport. Removable targets 106, 108 can enable the targets 106, 108 to be changed to enable different targets 106, 108 to be used for different calibration routines, for example, or different UAVs 104. In still other examples, the targets 108 can be glued or printed permanently on the walls 120 of the calibration room 102. In this manner, when the walls 120 are erected (as discussed above) the targets 108 are already in a fixed location with respect to the UAV 104 (or rather, the turntable 112).

In some examples, the calibration room 102 can also comprise one or more light sources 110. The light sources 110 can comprise conventional incandescent, fluorescent, neon, or light emitting diode (LED) lighting to enable the UAV 104 to detect the targets 106, 108 with one or more sensors (e.g., video cameras) and perform calibration routines. In other examples, the light sources 110 can also comprise incandescent or LED flashes, for example, to enable the UAV 104 to perform camera synchronization routines. In other words, when a flash goes off, for example, each camera on the UAV 104 preferably detects the light at substantially the same time and for substantially the same duration. Due to fluctuations in circuitry (e.g., resistance through various wires and components), however, slight adjustments may need to be made (on the order or milli- or microseconds) to better synchronize the cameras. These fluctuations can be detected and corrected for using the light sources 110.

In some examples, the system 100 can also comprise a turntable 112, or other mechanism, to move the UAV 104 about at least one axis of rotation. In some examples, the turntable 112 can rotate the UAV 104 through multiple axes. This movement can enable the UAV 104 to calibrate the cameras, pairs of cameras, and even the entire suite of cameras by "moving" the targets 106, 108 (or rather, moving the UAV 104) through the field of vision of the cameras. This can enable the parallax between two cameras in a stereoscopic pair of cameras to be determined, among other things.

In some examples, the system 100 can also comprise a controller 114. The controller 114 can be in communication with at least the turntable 112 and the light sources 110 to enable various calibration routines to be carried out. In some examples, the controller 114 can include one or more calibration routines for each type of UAV 104, for example. In this manner, a user can place the UAV 104 on the turntable 112 and activate the system 100. The controller 114 can then rotate the UAV 104, activate and/or adjust the light sources 110, and otherwise cause the system 100 to perform the calibration routine.

In other examples, the controller 114 can further comprise a transceiver 116 to enable the controller 114 to communicate with the turntable 112, the light sources 110, and the UAV 104. In this configuration, the UAV 104 may include one or more calibration routines stored internally enabling the UAV 104 to control at least the turntable 112 and light sources 110 directly. As a result, each UAV 104, or type of UAV 104, can store—and perform—the calibration routine autonomously. This may reduce the complexity of the system 100, for example, because the system 100 does not need to store the calibration routines for each type of UAV 104. In addition, this may increase the automation of the calibration routine with the UAV 104 essentially self-calibrating.

As below above, with respect to FIGS. 2A-2C, in some examples, the system 100 can include collapsible or foldable walls 120. To this end, in some examples, the system 100 can also include one or more telescoping legs 122. In some examples, the telescoping legs 122 can be manual and can be extended by a user when erecting the calibration room 102. In other examples, the telescoping legs 122 can be hydraulic or pneumatic and can enable the walls 120 to be erected automatically. In this configuration, the system 100 can include a hydraulic pump or compressor (collectively, pump 124) to power the telescoping legs 122.

In some examples, the system 100 can also comprise a storage compartment 126. The storage compartment 126 can comprise a well 128 and a lid 130. The well 128 can enable extra targets 106, 108, UAVs 104, and other parts to be stored below the floor 118 of the system 100. In some examples, as mentioned above, the UAV 104 may perform a first calibration using a first group of targets 106, 108, for example, and a second calibration using a second group of targets 106, 108. In this configuration, one group of targets 106, 108 can be stored in the well 128 while the other group of targets 106, 108 is in use, and vice-versa.

In some examples, the storage compartment 126 can also include a lid 130. This can enable the system 100 to have a substantially flat floor 118 when the lid 130 is closed. In some examples, as shown, the lid 130 can be hingeably coupled to the floor 118 to facilitate opening and closing. In other examples, the lid 130 can simply rest on a lip inside the well 128 and be lifted out for access.

Figure 2A:
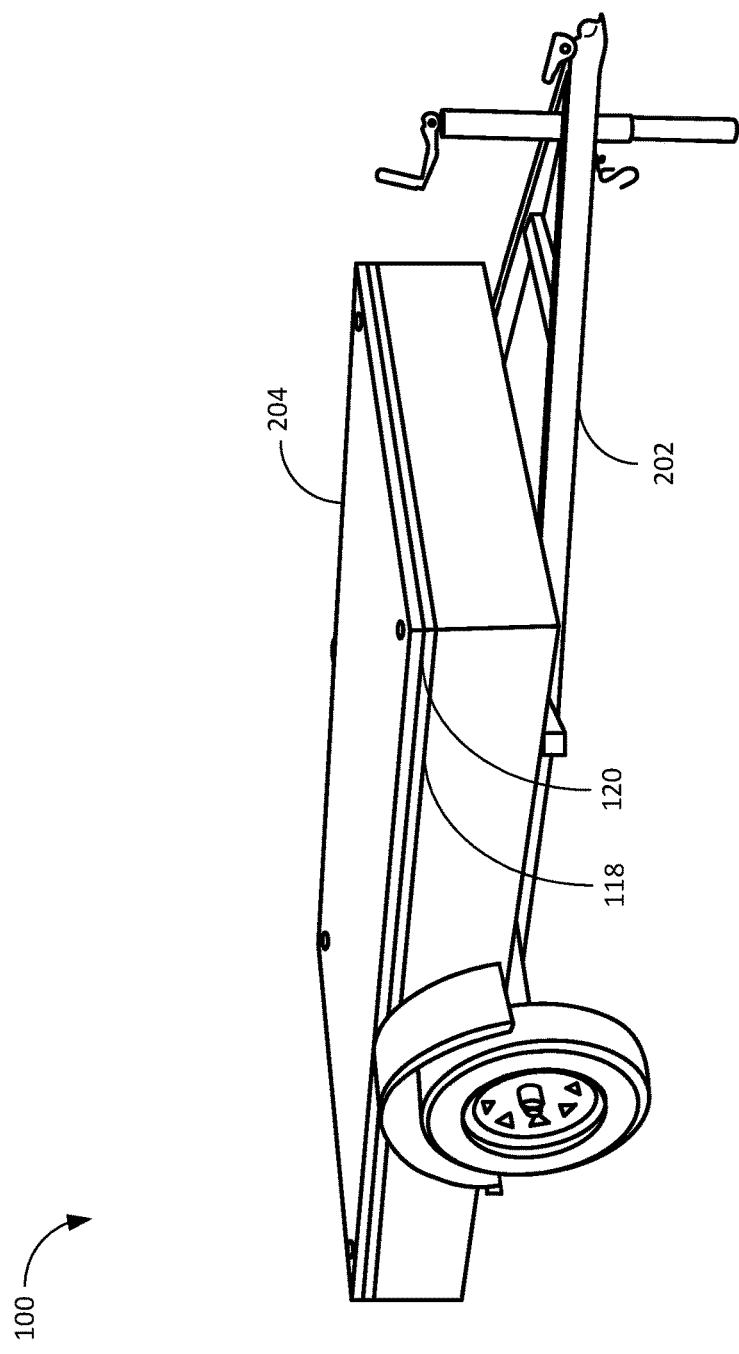
FIGS. 2A-2C depict an example of a soft-sided mobile calibration system in a stowed, deploying, and deployed position, respectively, in accordance with some examples of the present disclosure.
Figure 2B:
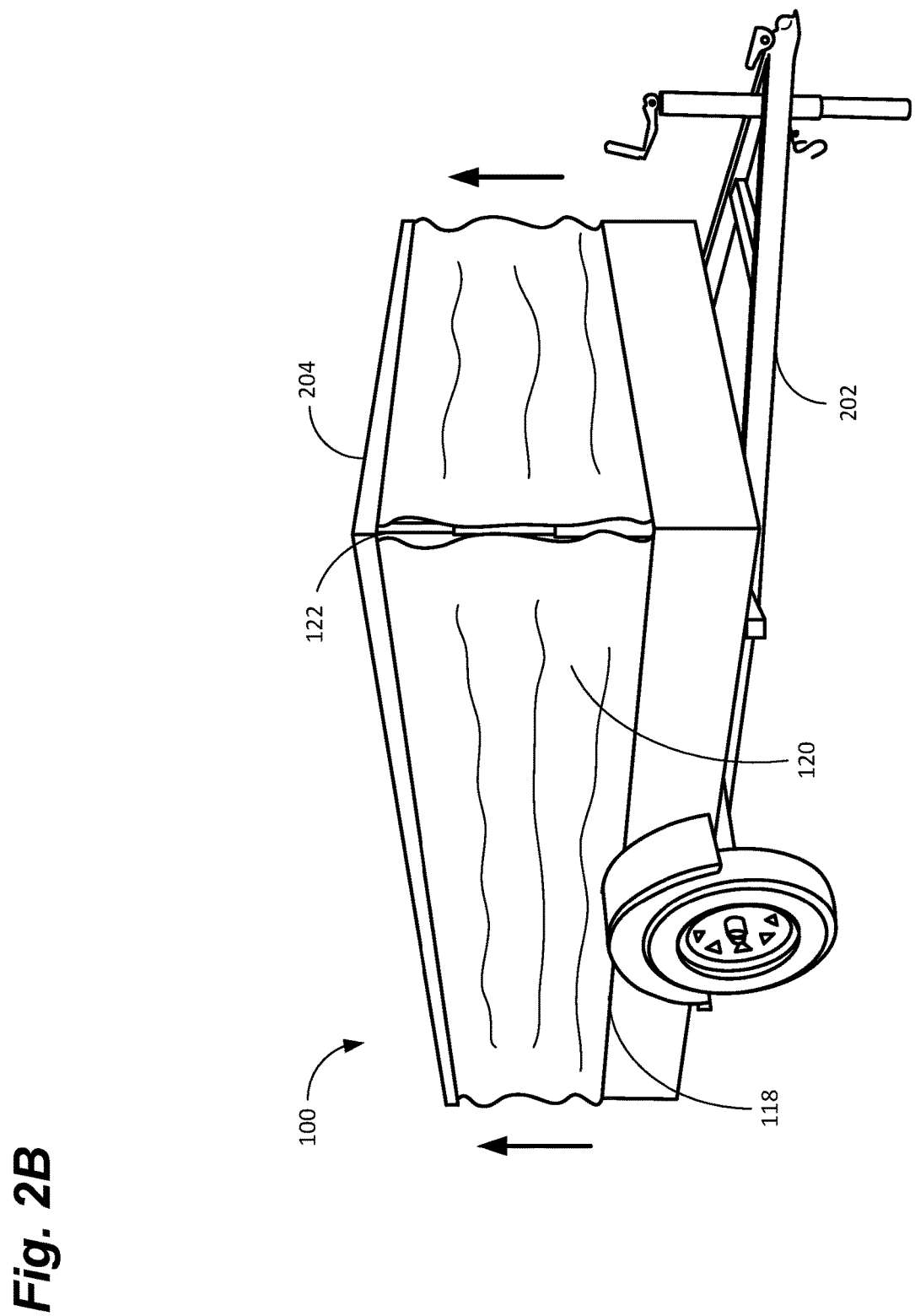
Figure 2C:
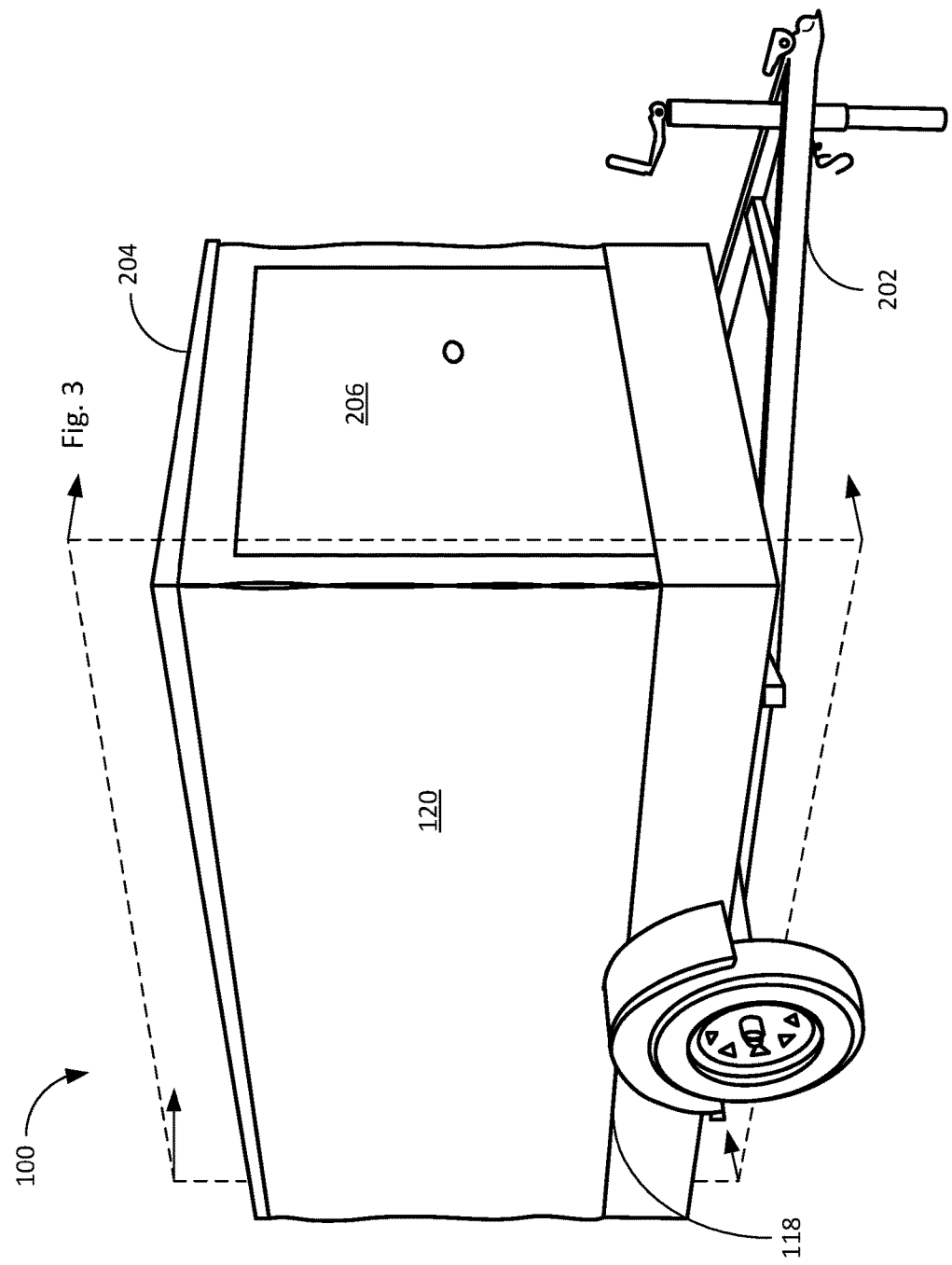

As shown in FIGS. 2A-2C, examples of the present disclosure can comprise a mobile calibration system 100 with collapsible walls 120 disposed on a trailer 202 for ease of transportation. As shown, in some examples, the system 100 can comprise a trailer 202, or other portable platform (e.g., a truck or other vehicle), to enable one or more sensors on a UAV to be calibrated in the field (e.g., at multiple warehouses). As shown, the system 100 can fold, collapse, or otherwise be portable. In some examples, the trailer 202 can comprise a conventional trailer hitch and can be pulled by a vehicle from location to location. As discussed below, in other examples, the system 100 can comprise a truck bed or can even be hand carryable.

The system 100 can include an enclosure with foldable or collapsible walls 120. In this manner, the system 100 can be collapsed when not in use. This can enable the system 100 to be stored in a reduced area. This can also reduce wind resistance, for example, when the system 100 is towed from one place to another. The system 100 can be collapsed in transit, similar to a "pop-up" camping trailer, and then erected on site.

As such, the system 100 can have a stowed position (FIG. 2A) and a deployed position (FIG. 2C). In the stowed position, the walls 120 of the calibration room 102 can be folded, stowed, or otherwise flattened such that the roof 204 and floor 118 are in close proximity to one another (i.e., closer proximity than in the deployed position). In the deployed position, the walls can be unfolded, unfurled, or otherwise erected to form an enclosure. As discussed below, the enclosure can include additional equipment and/or instrumentation to enable the UAV to be calibrated therein.

In some examples, as shown in FIGS. 2A-2C, the walls 120 can comprise a soft material (e.g., canvas or nylon), which can be furled or folded to enable the roof 204 to fold substantially flat onto the floor 118. In this configuration, the system 100 can comprise one or more telescoping legs 122, scissor lifts, air springs, or other mechanisms, to enable the roof 204 and walls 120 to move between the stowed position and the deployed position. In the stowed position, the telescoping legs 122 can be collapsed to enable the roof 204 and floor 118 to be in close proximity. In the deployed position, on the other hand, the telescoping legs 122 can extend and/or lock in place to support the roof 204 and walls 120 to form the calibration room 102. In some examples, one or more of the walls 120 can comprise a door 206, flap, or other means of access to the enclosure. In other examples, as discussed below with respect to FIGS. 11A-11E, the walls can be rigid and can fold down, or in, to enable the system to collapse.

Figure 3:
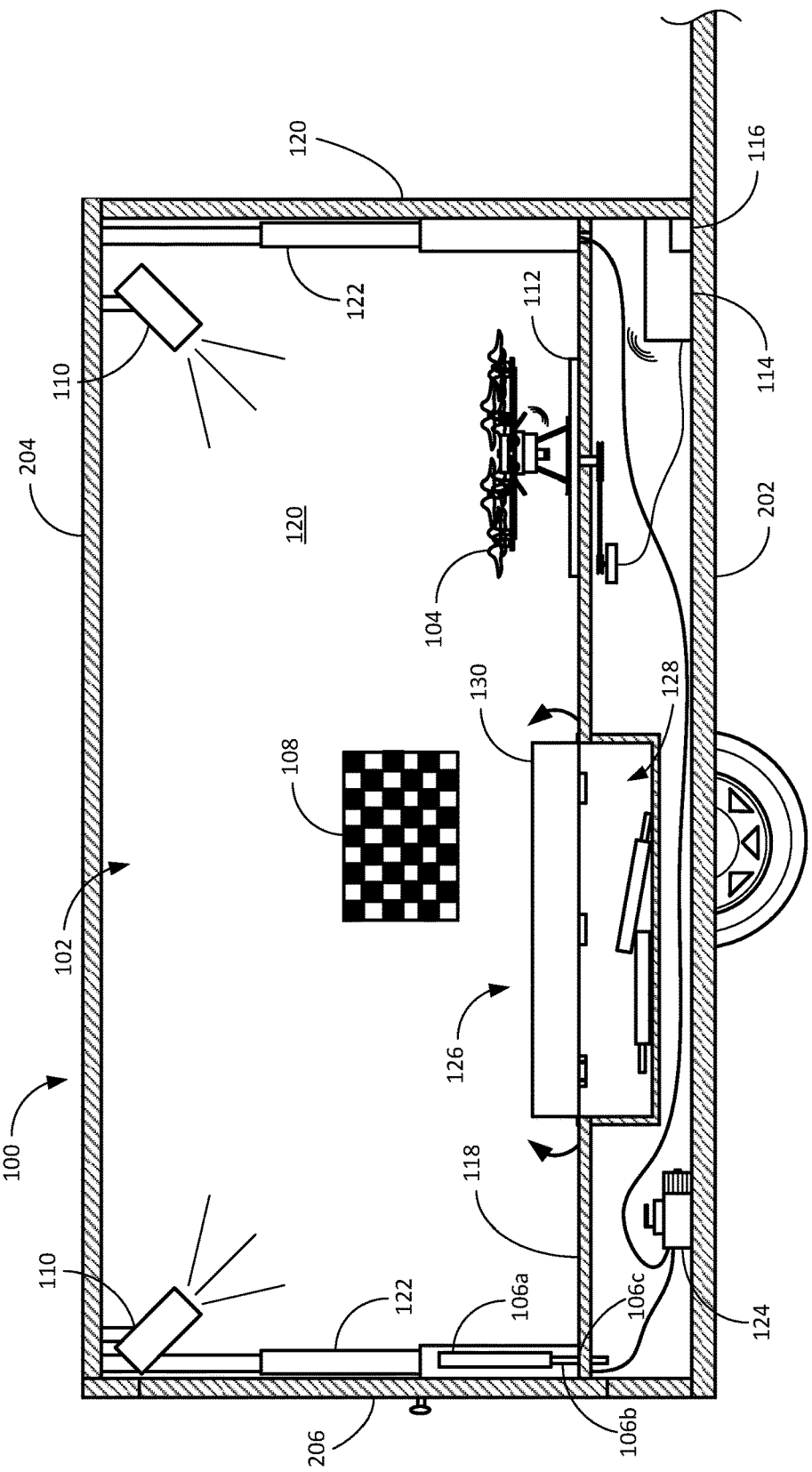
FIG. 3 depicts a cross-sectional view of the mobile calibration system in a trailer configuration, in accordance with some examples of the present disclosure.
Figure 4:
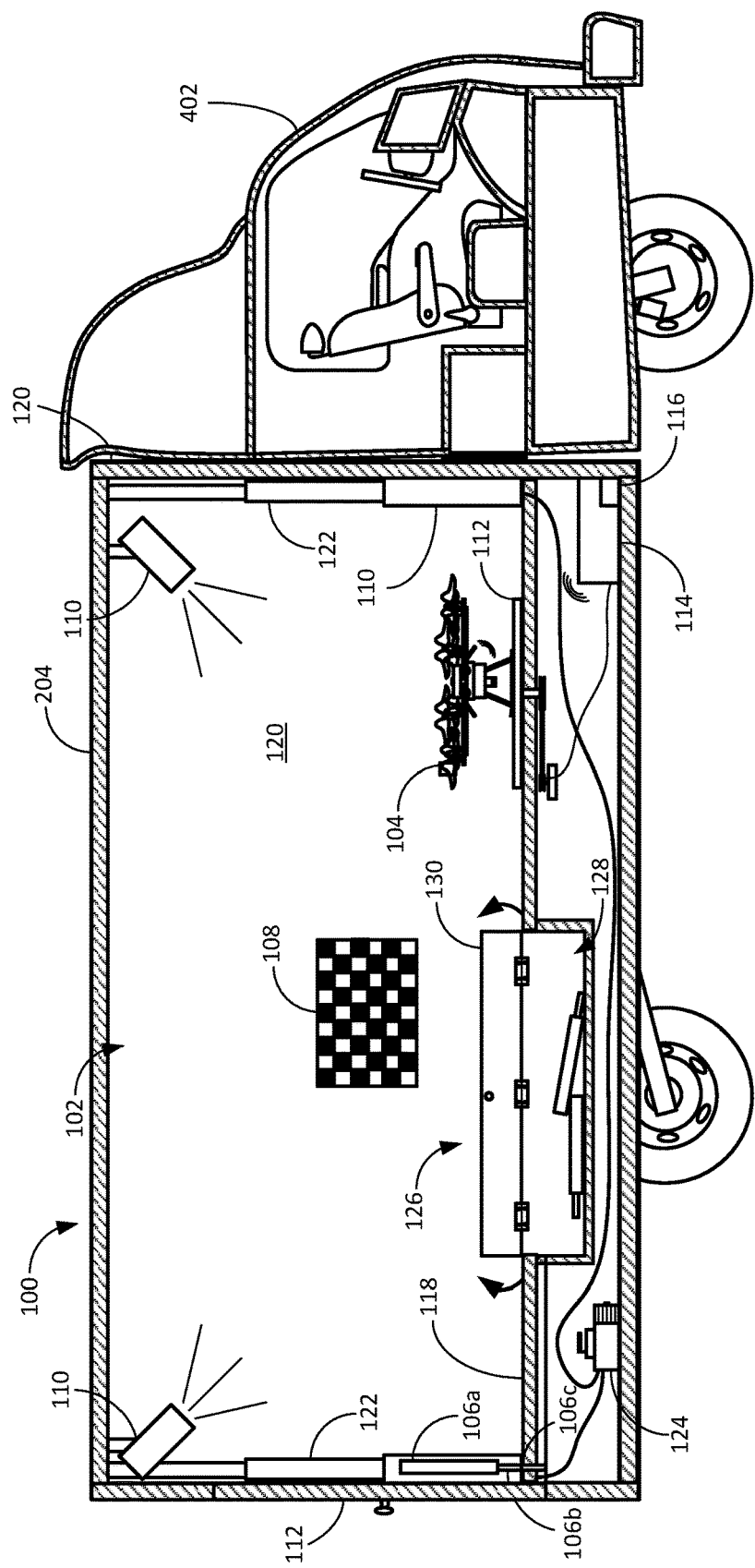
FIG. 4 depicts a cross-sectional view of the mobile calibration system in a truck configuration, in accordance with some examples of the present disclosure.

FIGS. 3 and 4 depict the system 100 in cross-section on a trailer 202 and a truck 402, respectively. FIG. 5 depicts a top view of the system 100. Regardless of the configuration, as mentioned above, the system 100 can comprise a calibration room 102 capable of housing one or more different types of UAVs 104. In some examples, the system 100 can also comprise one or more 2D or 3D targets 106, 108, one or more light sources 110, and a turntable 112. In some examples, the system 100 can also comprise a controller 114 to enable users and/or the UAV 104 to control one or more components in the calibration room 102.

As mentioned above, and shown in FIG. 5, the UAV 104 can comprise one or more cameras 502, 504, cameras, or pairs of cameras, which can be used for navigation, obstacle detection and avoidance, and location identification, among other things. In some examples, the cameras 502, 504 can include one or more pairs of stereoscopic cameras 502, with each pair facing in a different direction. In some examples, this can provide a substantially 360 degree view around the UAV 104. In some examples, the UAV 104 can also comprise a downward-looking and/or upward facing camera 504. The cameras can comprise still or video cameras and can include night-vision, infrared, thermal imaging, and other technologies. It can be useful, however, to calibrate the cameras from time to time.

The cameras 502, 504 can be calibrated by moving targets 106, 108 past the field of view of the cameras 502, 504, or vice-versa (i.e., moving the cameras 502, 504 past the targets 106, 108). The cameras 502, 504 can be calibrated individually to determine various inherent parameters of the cameras 502, 504 (e.g., focal length, field of view, lens distortion, etc.). The cameras 502, 504 can also be calibrated in stereoscopic pairs to identify any differences between the cameras 502, 504 and to calculate the parallax between the cameras 502, 504, which can be used for distance estimations, among other things. Finally, in some examples, the cameras 502, 504 can be calibrated as a whole ("platform" calibration) to provide an overall video profile for the UAV 104.

To this end, the system 100 can include at least one or more targets 106, 108 and a turntable 112. In some examples, the targets 106 can be affixed to the floor 118 of the system 100. As shown, the target 106 can comprise a target body 106a and a post 106b. In this configuration, the post 106b can be placed in a designated hole 106c in the floor 118, for example. This can enable the target 106 to be repeatably placed in the calibration room 102, for example, at a predetermined distance, $d_i$, from the turntable 112. In other words, placing the target 106 in the designated hole can position the target 106 at a predetermined distance (e.g., 1 or 2 meters) and/or height from the turntable 112 (and thus, the UAV 104). For repeatability of camera calibration, it may be useful to have known targets 106, 108 in known locations.

In other examples, the targets 108 can be attached to the walls 120 of the calibration room 102. The targets 108 can be affixed to the walls 120 using Velcro®, for example, to enable the targets 108 to be removed during transport.

Removable targets 106, 108 can enable the targets 106, 108 to be changed to enable different targets 106, 108 to be used for different calibration routines, for example, or different UAVs 104. In still other examples, the targets 108 can be glued or printed permanently on the walls 120 of the calibration room 102. In this manner, when the walls 120 are erected (as discussed above) the targets 108 are already in a fixed location with respect to the UAV 104 (or rather, the turntable 112).

In some examples, the calibration room 102 can also comprise one or more light sources 110. The light sources 110 can comprise conventional incandescent, fluorescent, neon, or light emitting diode (LED) lighting to enable the UAV 104 to detect the targets 106, 108 with one or more sensors (e.g., video cameras) and perform calibration routines. In other examples, the light sources 110 can also comprise incandescent or LED flashes, for example, to enable the UAV 104 to perform camera synchronization routines. In other words, when a flash goes off, for example, each camera 502, 504 on the UAV 104 preferably detects the light at substantially the same time and for substantially the same duration. Due to fluctuations in circuitry (e.g., resistance through various wires and components), however, slight adjustments may need to be made (on the order or milli- or microseconds) to better synchronize the cameras. These fluctuations can be detected and corrected for using the light sources 110.

In some examples, the system 100 can also comprise a turntable 112, or other mechanism, to move the UAV 104 about at least one axis of rotation. In some examples, the turntable 112 can rotate the UAV 104 through multiple axes. This movement can enable the UAV 104 to calibrate the cameras 502, 504, pairs of cameras 502, 504, and even the entire suite of cameras 502, 504 by "moving" the targets 106, 108 (or rather, moving the UAV 104) through the field of vision of the cameras 502, 504. This can enable the parallax between two cameras in a stereoscopic pair of cameras 502, 504 to be determined, among other things.

In some examples, the system 100 can also comprise a controller 114. The controller 114 can be in communication with at least the turntable 112 and the light sources 110 to enable various calibration routines to be carried out. In some examples, the controller 114 can include one or more calibration routines for each type of UAV 104, for example. In this manner, a user can place the UAV 104 on the turntable 112 and activate the system 100. The controller 114 can then rotate the UAV 104, activate and/or adjust the light sources 110, and otherwise cause the system 100 to perform the calibration routine.

In other examples, the controller 114 can further comprise a transceiver 116 to enable the controller 114 to communicate with the turntable 112, the light sources 110, and the UAV 104. In this configuration, the UAV 104 may include one or more calibration routines stored internally enabling the UAV 104 to control at least the turntable 112 and light sources 110 directly. As a result, each UAV 104, or type of UAV 104, can store—and perform—the calibration routine autonomously. This may reduce the complexity of the system 100, for example, because the system 100 does not need to store the calibration routines for each type of UAV 104. In addition, this may increase the automation of the calibration routine with the UAV 104 essentially self-calibrating.

As discussed above, with respect to FIGS. 2A-2C, in some examples, the system 100 can include collapsible or foldable walls 120. To this end, in some examples, the system 100 can also include one or more telescoping legs 122. In some examples, the telescoping legs 122 can be manual and can be extended by a user when erecting the calibration room 102. In other examples, the telescoping legs 122 can be hydraulic or pneumatic and can enable the walls 120 to be erected automatically. In this configuration, the system 100 can include a hydraulic pump or compressor (collectively, pump 124) to power the telescoping legs 122.

In some examples, the system 100 can also comprise a storage compartment 126. The storage compartment 126 can comprise a well 128 and a lid 130. The well 128 can enable extra targets 106, 108, UAVs 104, and other parts to be stored below the floor 118 of the system 100. In some examples, as mentioned above, the UAV 104 may perform a first calibration using a first group of targets 106, 108, for example, and a second calibration using a second group of targets 106, 108. In this configuration, one group of targets 106, 108 can be stored in the well 128 while the other group of targets 106, 108 is in use, and vice-versa.

In some examples, the storage compartment 126 can also include a lid 130. This can enable the system 100 to have a substantially flat floor 118 when the lid 130 is closed. In some examples, as shown, the lid 130 can be hingeably coupled to the floor 118 to facilitate opening and closing. In other examples, the lid 130 can simply rest on a lip inside the well 128 and be lifted out for access.

Figure 5:
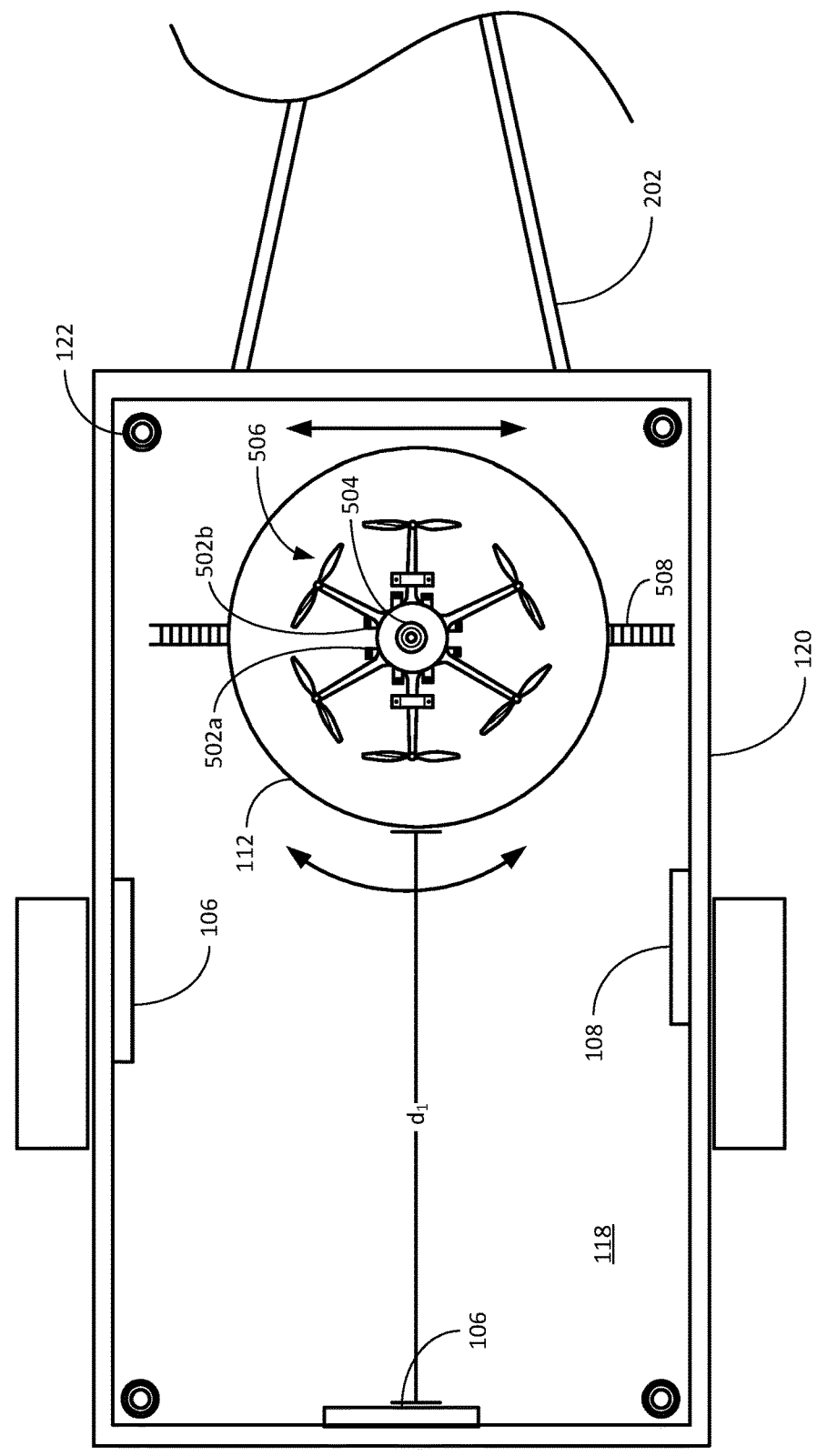
FIG. 5 depicts a top view of the mobile calibration system, in accordance with some examples of the present disclosure.
Figure 6:
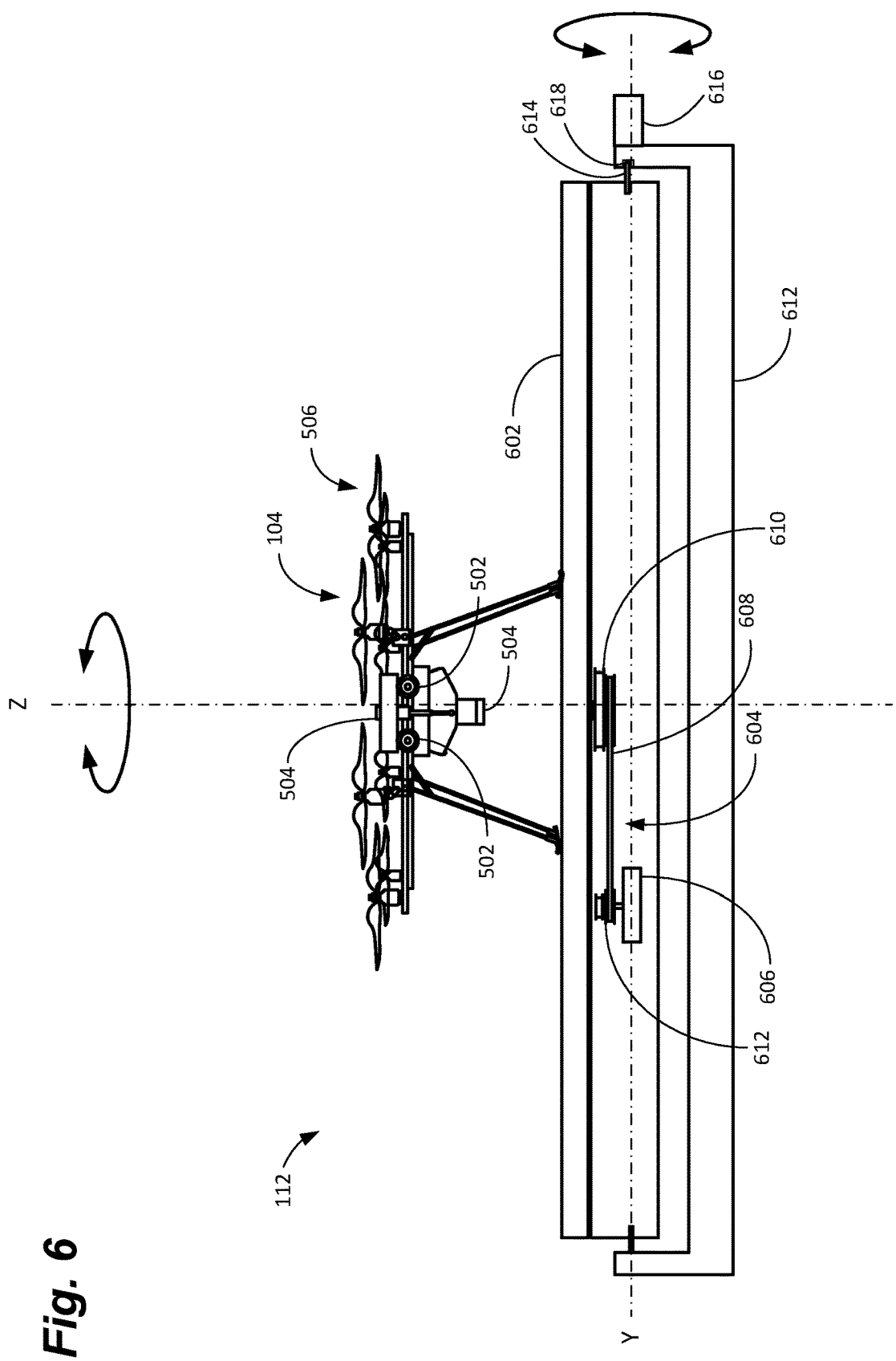
FIG. 6 depicts a side view of an example of a turntable and cradle for use with the mobile calibration system, in accordance with some examples of the present disclosure.

As shown in FIGS. 5 and 6, the turntable 112 can enable one or more sensors on the UAV 104 to be calibrated. FIG. 5 depicts a top view of the system including an example UAV 104 to be calibrated with the system 100. FIG. 6 is a detailed, side-view of an example of the turntable 112 for use with the system 100.

As shown, the UAV 104 can be placed (or fly), onto the turntable 112 for calibration. The UAV 104 can comprise a plurality of sensors, including one or more imagers or cameras 502, 504 (e.g., video or still cameras). In some examples, the cameras 502 can be configured in stereoscopic pairs. Stereoscopic pairs of cameras 502 can be used not only for image data, but also for ranging calculations using parallax, among other things. In some examples, the UAV 104 can include a stereoscopic camera pair in all four outward directions (e.g., forward, back, left, and right) to provide a substantially 360 degree view around the UAV 104. In some examples, the UAV 104 can also include upward and/or downward-looking cameras 504 to provide a view of a landing area, for example, or obstacles above the UAV 104 as it ascends (e.g., in an urban area).

Regardless of their actual configuration, it may be desirable to calibrate the cameras 502, 504 periodically to maintain the accuracy of various calculations, including parallax. It is possible, for example, for the cameras 502, 504 to rotate or shift, slightly on their mounts during use, for example, due to the vibration from the propulsion system 506. As a result, it may be desirable to calibrate each camera 502, 504, each pair of cameras 502, 504, and/or all of the cameras 502, 504 (a "platform" calibration).

To this end, the UAV 104 can be positioned on the turntable 112 and the turntable can be activated to rotate the UAV 104 about a first axis of rotation, Z. In this manner, the cameras 502, 504 can be rotated past the targets 106, 108. This provides at least two calibration functions—ranging and parallax.

As the cameras 502 are rotated past the targets 106, 108 on an arc, the distance between the cameras 502 and the targets 106, 108 changes. In other words, as the cameras 502 rotate past a target 106 on the turntable 112, the cameras 502 first get closer to the target 106, (A), and then farther away from the target 106, (B), along a known arc (C) of motion.

This motion can used to calibrate various parameters (e.g., focal length) for each individual camera 502.

Similarly, as each pair of cameras 502 is rotated past a target 106, there is some overlap in the field of view of each camera 502. In other words, as the turntable 112 rotates, the target 106 comes into view of a first camera 502a, then is visible by both the first camera 502a and a second camera 502b, then is only in view of the second camera 502b. This information, along with the field of view (e.g., 90, 120, 150, or 180 degrees) for the cameras 502, can be used to calculate the parallax between each camera 502 in a pair. As mentioned above, parallax can be used for ranging estimations, among other things.

Adding additional motions to the calibration routine can increase calibration accuracy and/or decrease calibration times. To this end, in some examples, the turntable 112 can be mounted on a track 508, or slot, to enable the turntable 112 to translate as well as rotate. The turntable 112 can be moved along the track 508 with an additional motor (not shown), or by the propulsion system 506 on the UAV 104. This enables the UAV 104 to rotate about a first axis and translate along a second axis to improve calibration accuracy and/or speed.

As shown in FIG. 6, the turntable 112 can include a platter 602 and a drive system 604 to enable the UAV 104 to be rotated about the first axis of rotation. The platter 602 can comprise a round platform that is substantially disc-shaped. A top portion of the platter may include, for example, a non-skid surface to substantially prevent the UAV 104 from moving with respect to the platter 602. In some examples, the platter 602 can include a target 106 for the downward-looking camera 504. In other examples, the platter 602 can be transparent to enable a target to be placed below the floor 118 at a greater distance from the downward-looking camera 504. In some examples, this can enable the downward-looking camera 504 to be calibrated at the same time as the side-looking cameras 502.

In some examples, the drive system 604 can be a direct drive system with the motor 606 connected directly to the platter 602. In other examples, as shown, the drive system 604 can comprise a motor 606 connected to the platter 602 via a belt 608 (or similar) and one or more pulleys 610. The belt 608 can comprise a v-belt, cogged belt, or other suitable belt. In some examples, the drive system 604 can comprise multiple pulleys 610 in different sizes to enable the turntable 112 to rotate at different speeds for different calibration procedures and/or UAVs 104. As mentioned above, rotating the UAV 104 with respect to the targets 106, 108 can enable one or more sensors on the UAV 104 to be calibrated.

In some examples, the turntable 112 can also comprise a cradle 614, or other device, that enables the turntable 112 to rotate about a third axis of rotation (e.g., tilt) and/or translate along a fourth axis. In some examples, the turntable 112 can be mounted on the cradle 614 using an axle or one or more pins 616, for example, to enable the turntable 112 to rotate, or pivot, with respect to the cradle 614. In some examples, the cradle 614 can also comprise a motor (e.g., an electric, pneumatic, or hydraulic motor) to pivot the turntable 112 about the third axis of rotation. In other examples, the cradle 614 can comprise one or more channels, or grooves 620, to enable the turntable 112 to translate along a fourth axis (e.g., into the page).

In either case, this additional movement can enable calibrations to be carried out more quickly and/or accurately by adding an additional degree of freedom to the motion of the UAV 104 during calibration. Thus, the cradle 614 can comprise a motor 618, actuator, linear servo, or similar to provide the second type of motion. Indeed, in some examples, the UAV 104 can be rotated and translated about multiple axes to create complex motion for the calibration procedure.

Figure 7:
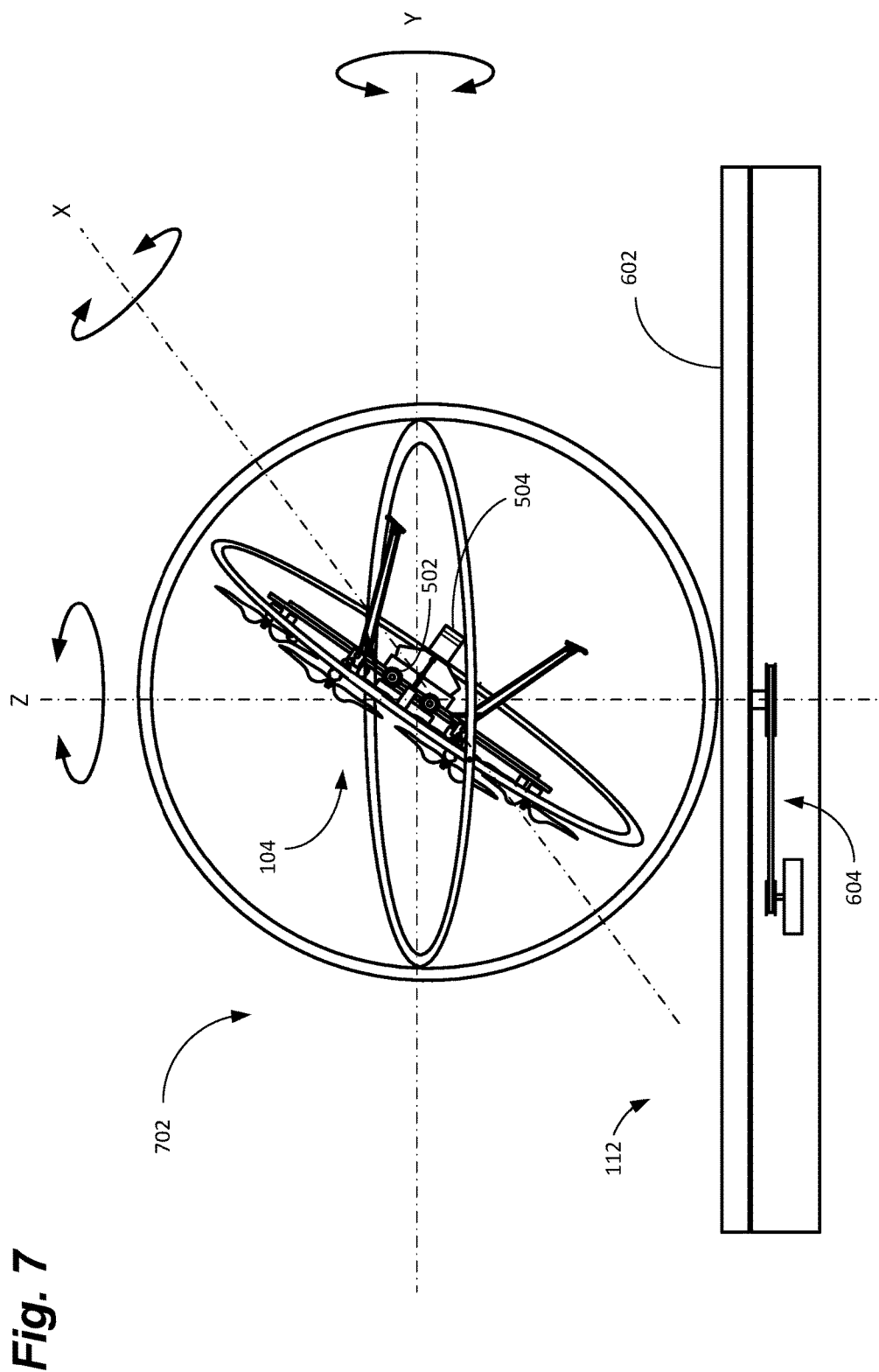
FIG. 7 depicts a side view of an example of a frame for use with the turntable of the mobile calibration system, in accordance with some examples of the present disclosure.

As shown in FIG. 7, in some examples, the turntable 112 can also include a frame 702. The frame 702 can enable the UAV 104 to rotate with respect to the turntable 112. In FIG. 7, the frame 702 is depicted as a gimbal, though it could take other forms. Like the cradle 614, discussed above, the frame 702 can enable the UAV 104 to be rotated along at least one different axis of rotation (e.g., the Y-axis) than the turntable 112 (e.g., the Z-axis). As mentioned above, this can enable the calibration process to be completed more accurately and/or more quickly.

In some examples, as shown, rotating the UAV 104 in the frame 702 can also enable the upward and/or downward-looking cameras 504 to be calibrated. In other words, in the upright position of the UAV 104, the downward-looking camera 504 may be positioned very close to the platter 602 of the turntable 112. In addition, because the UAV 104 is sitting on the turntable 112, any target placed on the platter 602, for example, would be motionless with respect to the UAV 104 making calibration difficult. Thus, while it may be possible to calibrate the upward looking camera 504 using a target 106, 108 on the roof 204, this may not be possible for the downward-looking camera 504 without rotating the UAV 104 or using a clear platter 602, as mentioned above.

To this end, in some examples, the frame 702 can enable the UAV 104 to rotate about at least a third axis of rotation, Y. In this manner, the UAV 104 can be rotated 90 degrees from an upright position to a side-facing position, for example. In this position, both the downward- and upward-looking cameras 504 can be calibrated using the targets 106, 108 on the walls 120 of the calibration room 102. As the turntable 112 rotates, therefore, the targets 106, 108 can move past the upward- and downward-looking cameras 504, for example, to enable them to be calibrated. In some examples, the frame 702 can be positioned such that at least one other camera (e.g., a side-looking camera 502) has an overlapping field of view with the upward- or downward-looking camera 504. In this manner, like the stereoscopic pairs mentioned above, the downward-looking camera 504 can be calibrated with respect to at least one other camera 502 or pair of cameras 502. In some examples, therefore, the UAV 104 may be tilted at an acute angle with respect to vertical to place one or more targets 106, 108 in the field of view of the upward- or downward-looking camera 504 and at least one side-looking camera 502.

Figure 8:
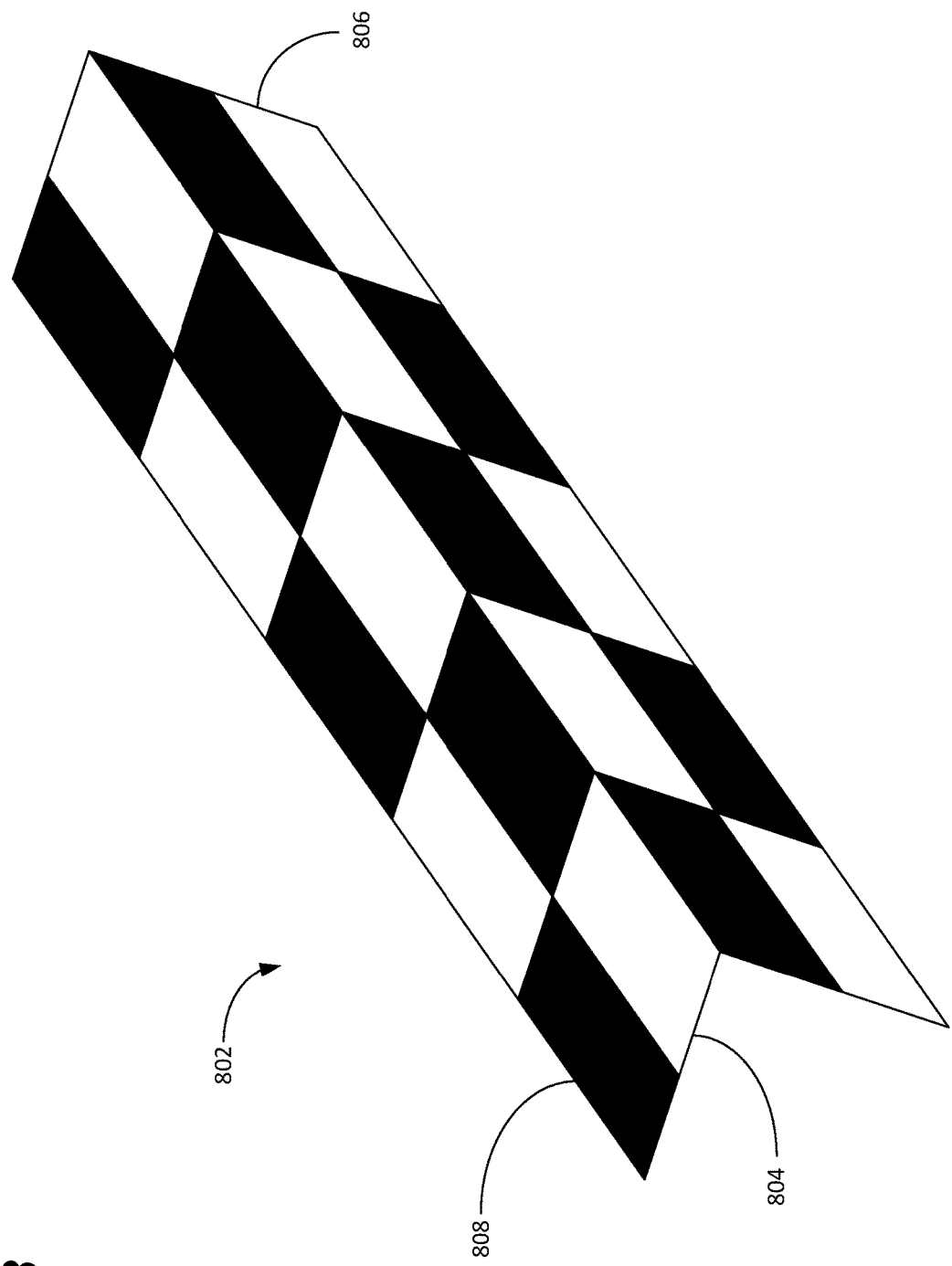
FIG. 8 depicts a side, perspective view of an example of a three-dimensional (3D) target for use with the mobile calibration system, in accordance with some examples of the present disclosure.

As shown in FIG. 8, in some examples, one or more of the targets 106, 108 can be a 3D target 802. As shown, in some examples, the 3D target can comprise a first face 804 and a second face 806 disposed at an angle to one another. The first face 804 and the second face 806 may be disposed perpendicular to each other (shown) or at many other angles. In some examples, the 3D target 802 can also comprise a repeating geometric pattern, such as a checkerboard (shown), grid, or concentric circles. Using targets 106, 108 can improve and/or speed the calibration process by providing known features in known configurations. Identifying a single feature 808 on the 3D target 802 in multiple cameras 502, 504, for example, can enable the calibration to solve for parallax. As discussed above, this information can then be used to provide ranging information to the UAV 104, among other things.

Of course, the target 802 could be other shapes and need not be in the configuration shown. Indeed, the features on the target 802 do not have to be known by the calibration routine and can be calculated, for example, using views from multiple cameras 502, 504. In some examples, using known targets 802 with known features and/or at known distances, however, can improve the speed and/or accuracy of the calibration process.

Figure 9A:
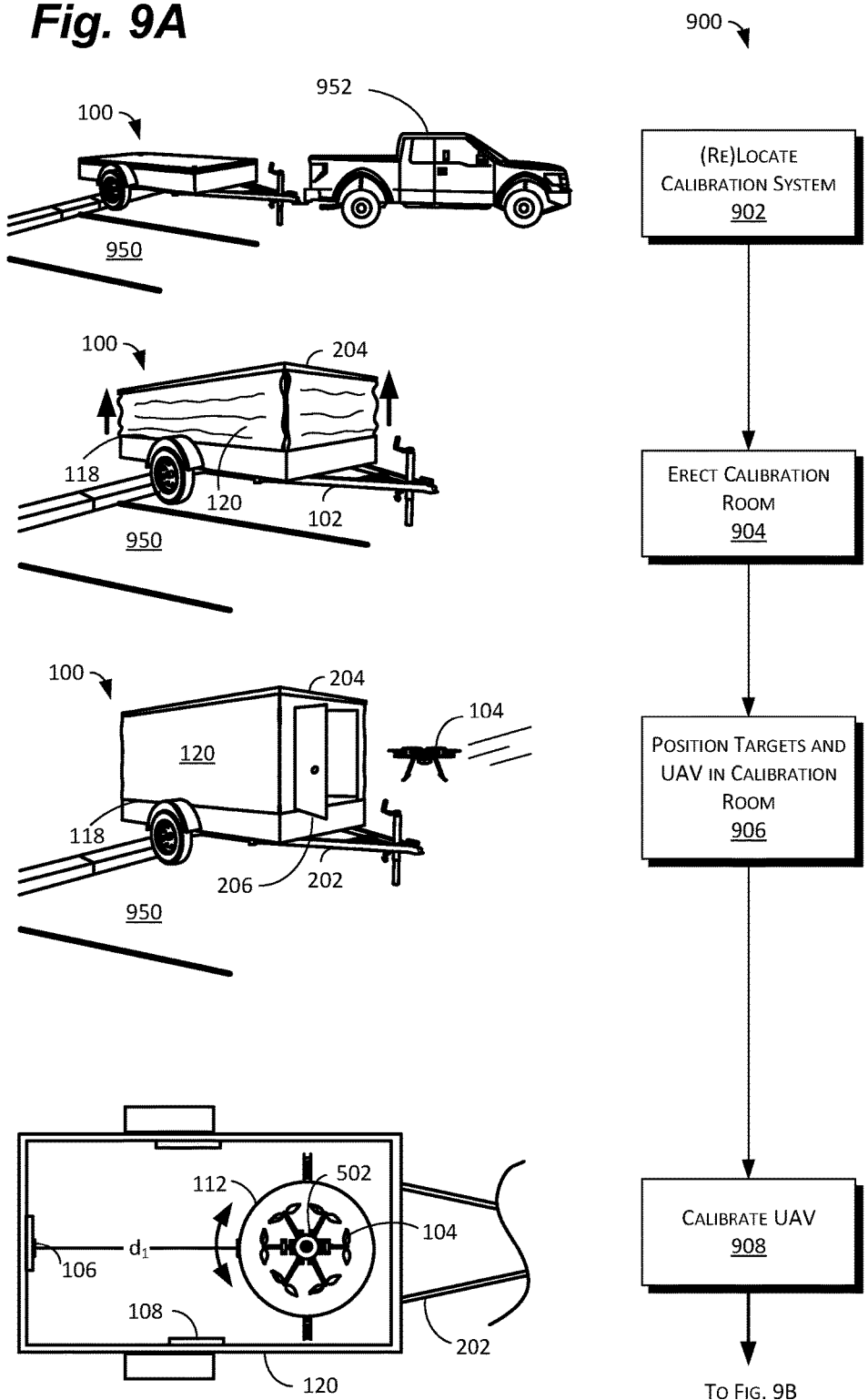

FIGS. 9A and 9B depict a method 900 for calibrating a UAV 104 using the mobile calibration system 100. As mentioned above, the mobile calibration system 100 enables a calibration room 102 to be set up in many locations. This enables calibrations to be performed in multiple locations without the need for a permanent calibration room in each location. In addition, because the system 100 can be used in multiple locations, variances between calibration rooms 102, targets 106, 108 and other factors are eliminated, which reduces variances between calibrations overall.

At 902, the mobile calibration system 100 can be moved to a suitable location for calibration. This may be in, or near, a warehouse where the UAVs 104 are being utilized, for example. Indeed, because the system 100 can be self-contained and weathertight, the system 100 may simply be set up in the parking lot 950 of the warehouse or facility, as shown. As mentioned above, in some examples, the system 100 can be carried on a trailer 202, which makes moving the system 100 from one location to another trivial. In some examples, the user may simply pull the system 100 with a pickup truck 952, or other vehicle, into the parking lot 950 at the warehouse, for example, and set up the system 100 for calibrations.

At 904, the mobile calibration system 100 can be moved from the stowed, or folded, position, to the deployed position for use. As mentioned above, in some examples, this can include unfurling soft-sided walls 120 and raising the roof 204 to a suitable height. In other examples, this can include unfolding and erecting rigid walls 120. See, FIGS. 11A-11E, below. In still other examples, the system can be configured inside a box van, or similar, which obviates the need to erect the walls 120 and roof 204.

At 906, the targets 106, 108 and UAV 104 can positioned in the calibration room 102. In some examples, this can include erecting and/or attaching the targets 106, 108 to the floor 118 and/or walls 120. As mentioned above, this can include the user retrieving the targets 106, 108 from the storage compartment 126 and placing them in designated holes in the floor 118, for example, or attaching the targets 106, 108 to the walls 120 using Velcro®. In other examples, the targets 106, 108 can be printed on, or permanently affixed to, the walls 120 avoiding this part of the step.

The UAV 104 can also be placed on the turntable 112. In some examples, the UAV 104 may be manually placed on the turntable 112 by the user. In other examples, the UAV 104 may fly directly onto the turntable 112, as shown. The turntable 112 can include a homing beacon, laser, or other means to enable the UAV 104 to accurately land on the turntable 112. In some examples, as discussed above, the UAV may be placed in a frame 702 on the turntable 112 to enable additional types of movement during calibration. In still other examples, the UAV 104 can be placed on the turntable 112 by an automated handling system (e.g., a robotic arm, conveyor, etc.)

At 908, the UAV 104 can be calibrated by rotating, pivoting, and/or translating the turntable 112 and/or the UAV 104. As mentioned above, in some examples, the turntable 112 can be mounted in a cradle 614 that enables the turntable 112 to translate and/or pivot. In other examples, the system 100 can include a frame 702 mounted on the turntable 112 that enables the UAV 104 to rotate and/or translate. Thus, the UAV 104 can be rotated about a first axis of rotation defined by the turntable 112 and rotated about, or translated along, a second axis defined by the cradle 614 and/or frame 702. This additional movement can improve the accuracy and/or speed of the calibration of the UAV 104.

At 910, the now calibrated UAV 104 can be removed from the calibration room 102. As before, in some examples, this can include the user manually removing the UAV 104 from the calibration room 102. In other examples, the UAV 104 can simply fly out of the calibration room 102 under its own power. In still other examples, the UAV 104 can be removed from the turntable by an automated handling system.

At 912, once all UAVs 104 in a particular location in need of calibration have been calibrated, the system 100 can be moved from the deployed position to the stowed position. This can include folding or furling soft-sided walls 120, for example, or folding in rigid walls 1102 (discussed below), among other things. In some examples, the system 100 can also include one or more latches or straps to secure the system 100 in the stowed position for transport.

At 914, the system 100 can be repositioned to perform additional calibrations in a different location (e.g., at a different warehouse). As shown, the system 100 can be transported on a trailer 202. In the stowed position, the frontal area of the trailer 202 is reduced, which improves aerodynamics and visibility, and generally eases the towing process. In other examples, the system 100 can be hand carried, placed in the trunk or bed of a vehicle, or otherwise be transportable.

The transportability of the system 100 enables UAVs 104 to be calibrated in multiple locations using a single piece of equipment. In this manner, dedicated calibrations rooms, or even calibration space, is not required at each location. Indeed, as discussed above, the system 100 can be erected in the parking lot, or other open area, used to calibrate one or more UAVs 104, and then moved. In the stowed position, the system 100 is not only easier to transport, but easier to store. As a result, when not in use, the system 100 can simply be left in a parking space or stored in a warehouse.

Figure 10:
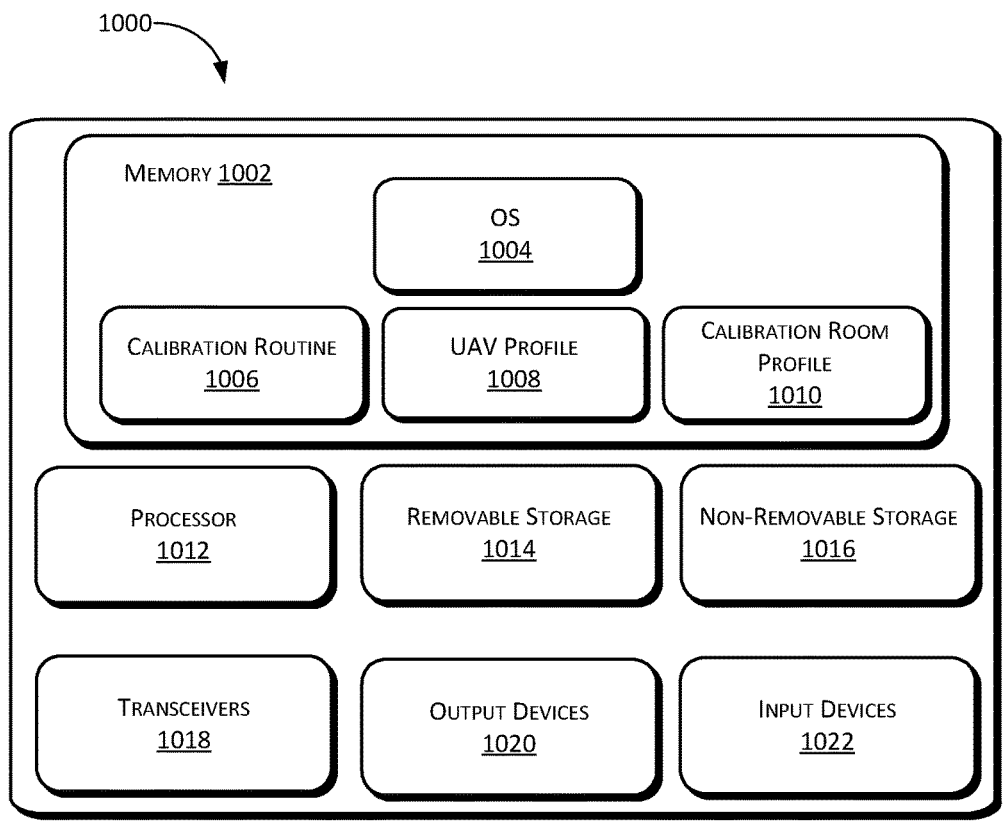
FIG. 10 depicts an example of an electronic device for use with the mobile calibration system, in accordance with some examples of the present disclosure.

FIG. 10 depicts an electronic device 1000 for use with the system 100. For ease of description, the electronic device 1000 is described below with reference to the UAV 104. One having skill in the art will recognize, however, that the electronic device 1000 could be the controller 114, for example, or other component in the system 100. To this end, the electronic device 1000 can include a number of features to enable the controller 114 or UAV 104 to carry out the various functions discussed herein.

As discussed below, the electronic device 1000 can comprise memory 1002 configured to include computer-executable instructions including at least an operating system (OS) 1004 for the UAV 104, UAV calibration routines 1006, UAV profile data 1008, and calibration room profiles 1010. The electronic device 1000 can also include one or more processor(s) 1012, removable storage 1014, non-removable storage 1016, transceivers 1018, output device(s) 1020, and input device(s) 1022.

In various implementations, the memory 1002 can be volatile (such as random access memory, or RAM), non-volatile (such as read only memory (ROM), flash memory, etc.), or some combination of the two. The memory 1002 can also include an OS 1004 for the UAV 104 to control the various inputs and outputs, receive and transmit data, and perform other functions.

The memory 1002 can also include the UAV calibration routine 1006. As mentioned above, the UAV calibration routine 1006 can include information related to the specific configuration of the UAV 104 being calibrated. The UAV calibration routine 1006 can also include information related to the number of cameras 502, 504 on the UAV 104, their relative positions, focal lengths, and other data. In this manner, the UAV 104 can essentially "self-calibrate" using the system 100. Of course, as mentioned above, some or all of the information can also be stored on, and accessed by, the controller 114.

The memory 1002 can also include UAV profile data 1008. So, for example, for a multi-rotor copter-type UAV 104, the UAV profile data 1008 can include the number of propellers and motors, weights and balances, power settings, battery capacity and other physical information necessary to create and/or perform an accurate calibration. The UAV profile data 1008 can also include six degrees-of-freedom simulation data related to measured, or calculated, flight characteristics such as, for example, rates of climb, rates of turn, acceleration and deceleration, and other performance measures. In this manner, the propulsion system 506 on the UAV 104 may be used, for example, to perform certain maneuvers during the calibration (e.g., to cause the UAV 104 to rotate in the frame 702).

The memory 1002 can also include a calibration room profile 1010. This can include information related to the size and layout of the calibration room 102. The calibration room profile 1010 can include data associated with calibrations rooms 102 based on different platforms such as, for example, systems 100 based on different trailers 202 or trailer-based systems vs. hand-carried systems. The calibration room profile 1010 can also include information related to the type and location of the targets 106, 108 in a particular calibration room 102. The calibration room profile 1010 can include information related to how many 2D and 3D targets are included, the location of each target 106, 108, and one or more known features on the targets 106, 108 that may be useful for the UAV calibration routine 1006, for example.

In some implementations, the processor(s) 1012 can comprise a central processing unit (CPU), a graphics-processing unit (GPU), both a CPU and a GPU, or any other sort of processing unit. The processor(s) 1012 can be responsible for running software on the electronic device 1000, including the OS 1004 and the aforementioned routines and profiles 1006-1010, and to interpret and send data to and from the UAV 104. In some examples, the processor(s) 1012 can also perform calculations and provide instructions to the UAV 104 based on the various input device(s) 1022, discussed below.

The electronic device 1000 can also include additional data storage devices (removable and/or non-removable) such as, for example, magnetic disks, optical disks, or tape. Such additional storage is illustrated in FIG. 10 by removable storage 1014 and non-removable storage 1016. The removable storage 1014 and non-removable storage 1016 can store the various modules, programs, and algorithms for the navigation, landing, and calibration processes and can include routines for scheduling and canceling deliveries, among other things.

Non-transitory computer-readable media may include volatile and nonvolatile, removable and non-removable tangible, physical media implemented in technology for storage of information, such as computer readable instructions, data structures, program modules, or other data. The memory 1002, removable storage 1014, and non-removable storage 1016 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 1000. Any such non-transitory computer-readable media 1014, 1016 may be part of the electronic device 1000 or may be a separate device (e.g., a jump drive) or a separate database or databank (e.g. at the electronic device 1000).

In some implementations, the transceivers 1018 can include any sort of transceivers known in the art. For example, the transceivers 1018 may include wireless modem(s) to facilitate wireless connectivity with a local area network (LAN), the electronic device 1000, the UAV 104, the Internet, and/or an intranet. Further, the transceivers 1018 may include a radio transceiver that performs the function of transmitting and receiving radio frequency communications via an antenna (e.g., Wi-Fi or Bluetooth®). Also, or instead, the transceivers 1018 may include wired communication components, such as a wired modem or Ethernet port, for communications between, for example, the UAV 104 and the controller 114.

In some implementations, the output device(s) 1020 can include any sort of output devices known in the art, such as a display (e.g., a liquid crystal display (LCD), light emitting diode (LED) display, or thin-film transistorized (TFT) screen), a touchscreen display, lights, speakers, a vibrating mechanism, or a tactile feedback mechanism to provide interactive feedback to the controller 114 and/or the UAV 104. In some examples, the output device(s) 1020 can play various sounds based, for example, on whether the calibration room 102 is safe to enter, the UAV 104 is landing, or if there is an object preventing the UAV 104 from landing. Output device(s) 1020 also include ports for one or more peripheral devices, such as headphones, peripheral speakers, or a peripheral display.

In various implementations, input device(s) 1022 can include any sort of input devices known in the art. For example, input device(s) 1022 may include a camera, a microphone, a keyboard/keypad/touchpad, a touch-sensitive display, a proximity sensor, and a tilt sensor. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 1022 can also include communication ports on the UAV 104 or controller 114 to enable communication between the UAV 104 and/or the controller 114 and other system components (e.g., the turntable 112 and/or light sources 110).

Figure 11A:
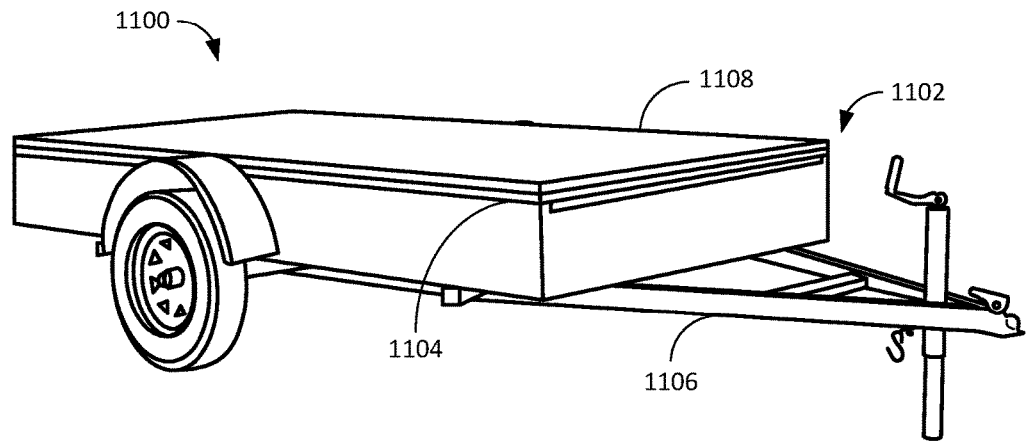
FIGS. 11A-11E depict an example of a hard-sided mobile calibration system in a stowed (FIG. 11A), deploying (FIGS. 11B-11D), and deployed (FIG. 11E) position, in accordance with some examples of the present disclosure.

As shown in FIGS. 11A-11E, in some examples, rather than having soft-sided walls 120, the system 1100 can comprise rigid, or semi-rigid, folding walls 1102. In this configuration, the system 1100 can comprise a plurality of walls 1102 that fold flat into a stowed position and unfold into a deployed position. As shown in FIG. 11A, in the stowed position, all of the walls 1102 can be folded substantially flat to the floor 1104. In this configuration, in trailer 1106 form (as shown) the system 1100 presents a reduced frontal area for improved aerodynamics and uses less space for storage.

Figure 11B:
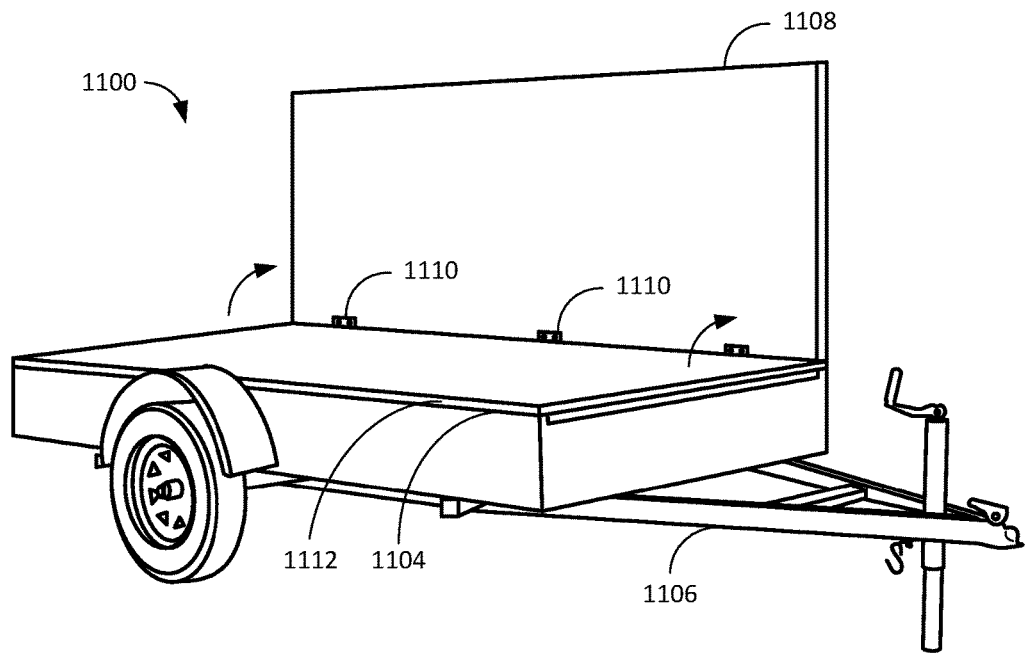

As shown in FIG. 11B, in some examples, a first wall 1108 of the plurality of walls 1102 can be unfolded from the stowed, or flat, position approximately 90 degrees[1] to the deployed condition. In some examples, the walls 1102 can be attached to the floor 1104 or trailer 1106 using one or more hinges 1110 (e.g., door or piano hinges), straps, or other suitable means. In some examples, the walls 1102, floor 1104, and/or the trailer 1106 can further include latches, pins, or other means for securing the walls 1102 in the stowed position and/or the deployed position.

[1] As used herein, "approximately 90 degrees" refers to a range (e.g., 85-95 degrees) where the walls are as close to vertical as is mechanically practical in a folding, or collapsible, configuration. Obviously, some variance caused by hinges, materials, flexing, wear, and other factors is to be considered.

Figure 11C:
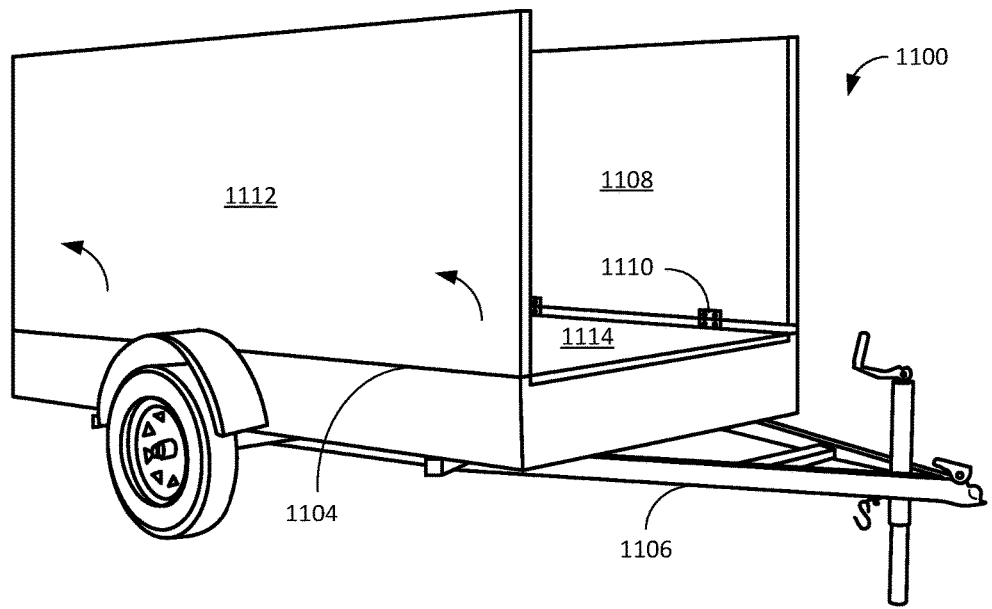
Figure 11D:
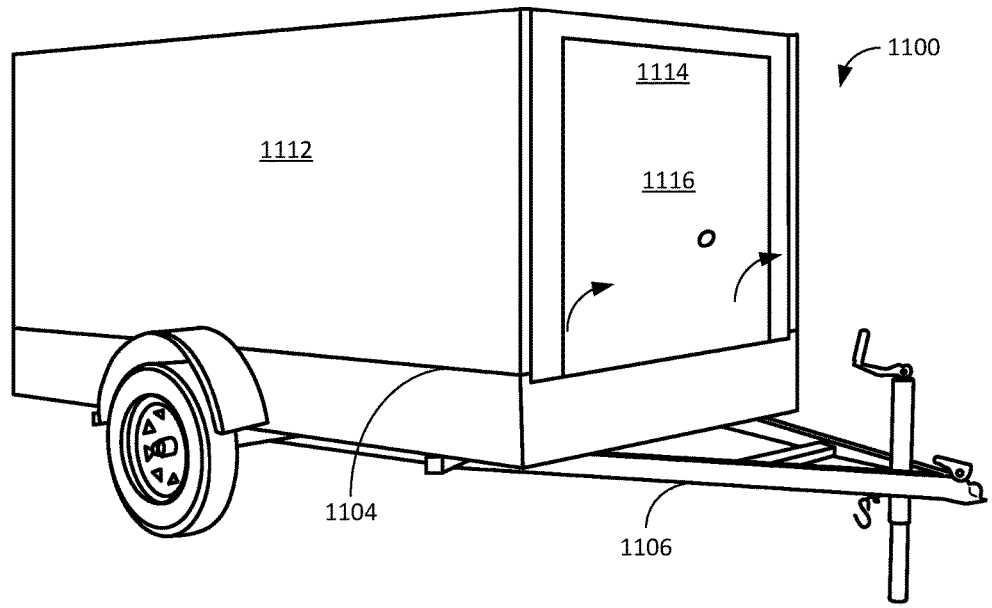

As shown in FIG. 11C, the second wall 1112 can then be deployed in the same manner. As shown in FIG. 11D, the first end wall 1114 and second end wall (not shown) can also be erected. In some examples, each wall 1102 can be latched to the floor 1104 and/or trailer 1106. In other examples, each wall 1102 can also be latched, or otherwise affixed to, each adjacent wall.

In some examples, one of the walls 1102 (e.g., the first end wall 1114) can also include a door 1116 to provide ingress to, and egress from, the calibration room 102. In some examples, the door 1116 can be a rigid door hingeably coupled to the wall 1102. In other examples, the door 1116 can be a simple flap, flexible strips, or other means to provide access. The door 1116 can be disposed in any, or more than one, of the walls 1102, or could be the wall 1102 itself. In other words, to provide access for particularly large UAV, for example, the door 1116 could be very large, or could comprise a hinging wall 1102 (i.e., where the whole wall 1102 opens). For systems 1100 for use with smaller UAVs 104, on the other hand, the door 1116 can comprise a portion of the wall 1102, which may increase the rigidity of the wall 1102 or door 1116, for example.

Figure 11E:
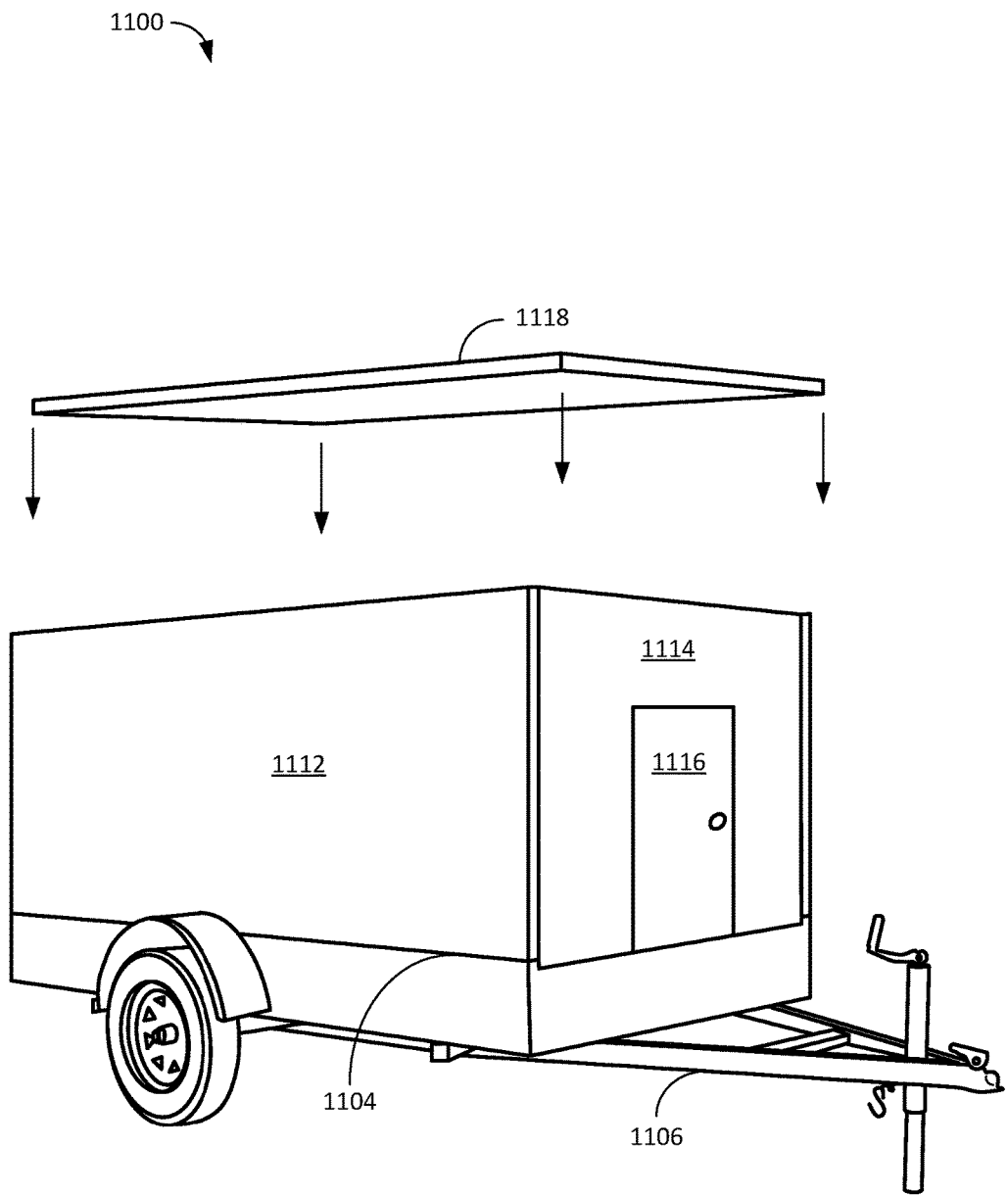

As shown in FIG. 11E, in some examples, the system 1100 can also include a roof panel 1118. In some examples, as discussed above, the roof panel 1118 can be supported by one or more collapsible supports (e.g., telescoping legs 122) that move the roof panel 1118 between the stowed position and the deployed position. In other examples, the roof panel 1118 can be separate and can be lifted into place during deployment. As before, in some examples, the roof panel 1118 can be pinned, hinged, latched, or otherwise secured to the walls 1102.

In some examples, rigid walls 1102 may provide a more dimensionally stable calibration room 102 when compared to soft-sided walls 120. In some examples, rigid walls 1102 may also provide more consistent placement and support of targets 106, 108, for example, because the walls 1102 do not flap in the breeze, among other things. Of course, this may be at the expense of some additional weight and cost to the overall system 1100.

Figure 12:
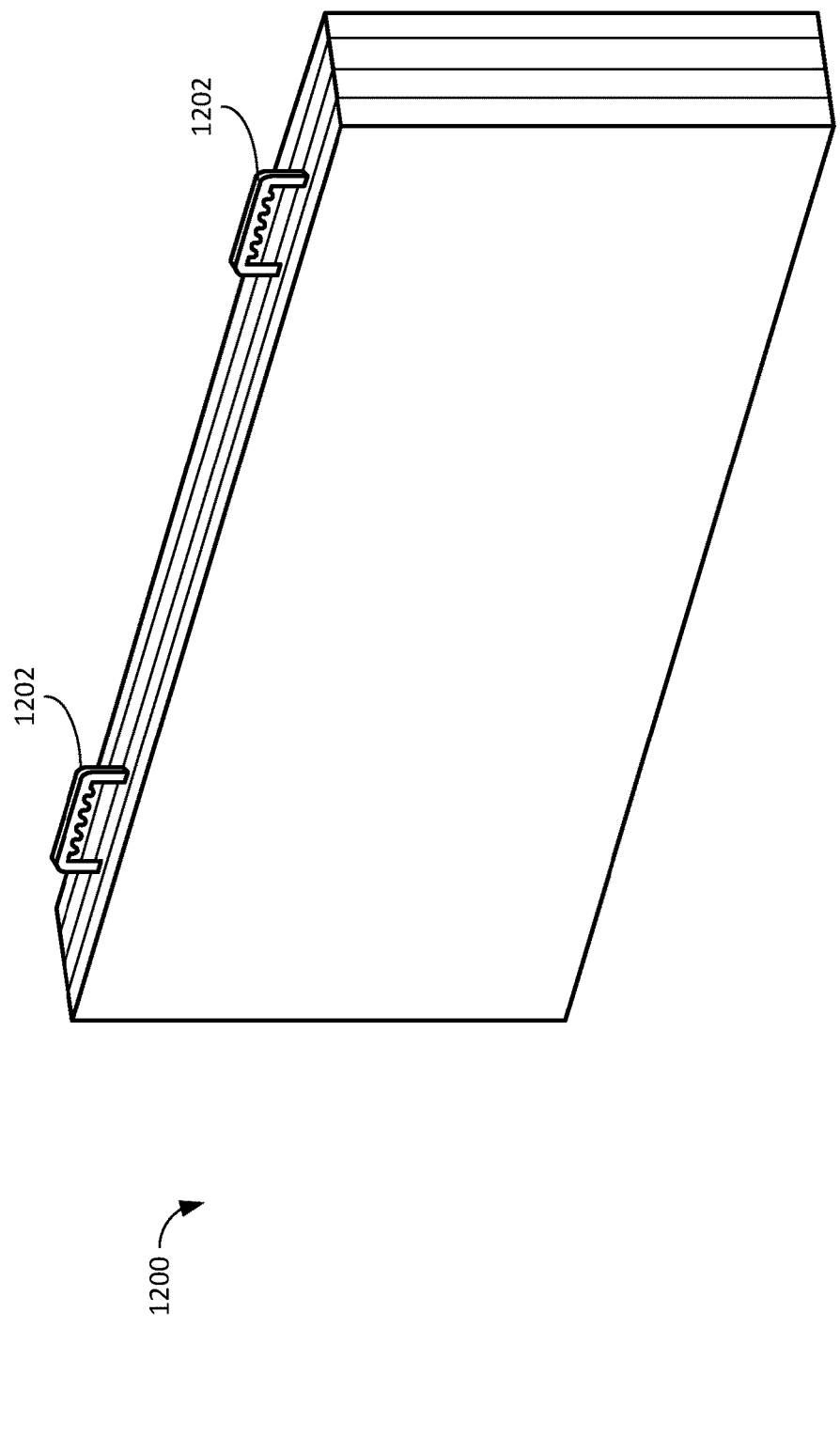
FIG. 12 depicts an example of a hand-carryable mobile calibration system, in accordance with some examples of the present disclosure.

As shown in FIG. 12, in some examples, the system 1200 can be portable enough to obviate the need for a trailer 202. In some examples, the system 1200 can comprise one or more handles 1202 and can be small and light enough to be carried by hand. In other examples, the system 1200 can be small and light enough to be carried on a hand truck, cart, or similar. In this configuration, as before, the system 1200 can have a stowed position and a deployed position and can be moved from place to place to provide a standardized calibration room 102.

While several possible examples are disclosed above, examples of the present disclosure are not so limited. For instance, while the system 100, 1100, 1200 has been disclosed for use with a trailer or to be carried by hand, the system 100, 1100, 1200 could also be configured in the box of a box truck, for example, or in the bed of a pickup. In addition, the location and configuration used for various features of examples of the present disclosure such as, for example, the order of steps, the components of the system 100, the location and type of targets 106, 108, the use of a cradle 614 or a frame 702, and other features can be varied according to a particular trailer 202, for example, or warehouse that requires a slight variation due to, for example, the size or construction of the trailer 102, the type of vehicle 952 used, or the types of UAVs 104 being calibrated. Such changes are intended to be embraced within the scope of this disclosure.

The specific configurations, machines, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A mobile calibration system for unmanned aerial vehicles (UAVs), the system comprising:
   a trailer to enable the mobile calibration system to be moved using a vehicle; and
   a collapsible calibration room comprising:
     a floor;
     three or more walls configured to be coupled to the floor and moveable between a stowed position and a deployed position;
     a ceiling configured to be couple to at least one of the three or more walls and moveable between the stowed position and the deployed position; and
     one or more targets disposed on one or more of the three or more walls or the floor;
   one or more light sources disposed on the three or more walls or the ceiling to provide illumination inside the collapsible calibration room; and
   a turntable supported by the floor to rotate a UAV about a first axis of rotation to enable calibration of one or more cameras on the UAV.

2. The system of claim 1, the collapsible calibration room further comprising:
   one or more telescoping legs to support the three or more walls;
   wherein the walls comprise a flexible material to enable the walls to be furled into the stowed position and unfurled into the deployed position.

3. The system of claim 1, the turntable further comprising a frame to enable the UAV to rotate about a second axis of rotation different from the first axis of rotation.

4. The system of claim 1, further comprising:
   a controller configured to execute a calibration routine to calibrate at least one sensor on the UAV, the controller controlling at least one of the one or more light sources and the turntable.

5. The system of claim 1, further comprising:
   a controller in communication with the UAV and at least one of the one or more light sources and the turntable;
   wherein the UAV is configured to execute a calibration routine to calibrate at least one sensor on the UAV using at least the turntable and the one or more targets; and
   wherein the UAV controls the at least one of the one or more light sources and the turntable via the controller.

6. A mobile calibration room system comprising:
a mobile calibration room comprising:
a floor comprising a storage compartment;
at least one wall moveable between a stowed position and a deployed position; and
a ceiling moveable between a first position proximate the floor in the stowed position and a second position in the deployed position;
one or more targets disposed on one or more of the walls or the floor; and
a turntable to rotate an unmanned aerial vehicle (UAV) about a first axis of rotation to enable calibration of one or more cameras on the UAV;
wherein the UAV is rotated on the turntable with respect to the one or more targets according to a calibration routine to calibrate at least one camera on the UAV.

7. The system of claim 6, wherein at least one of the one or more targets comprises a three-dimensional (3-D) target, the 3-D target comprising:
a first face comprising at least one of a repeating geometric pattern or a feature configured to be identified during a calibration routine used to calibrate at least one camera on the UAV; and
a second face disposed at an angle to the first face.

8. The system of claim 6, further comprising:
a frame disposed on the turntable to enable the UAV to rotate about a second axis.

9. The system of claim 8, wherein the frame enables the UAV to rotate about the second axis and a third axis.

10. The system of claim 6, wherein the turntable is disposed on a cradle to enable the turntable to at least one of rotate or translate with respect to the mobile calibration room.

11. The system of claim 6, further comprising:
one or more light sources disposed in the mobile calibration room; and
a controller in communication with at least the one or more light sources and the turntable to perform the calibration routine.

12. The system of claim 11, further comprising:
a transceiver in communication with at least the controller and the UAV to enable the UAV to control at least the turntable and the one or more light sources to perform the calibration routine.

13. The system of claim 6, wherein the floor comprises at least one designated hole to receive at least one of the one or more targets; and
wherein at least one of the one or more targets comprises a target body and a post, the post configured to be placed in the hole.

14. A method comprising:
positioning a mobile calibration system in a first location to calibrate at least one sensor on at least one unmanned aerial vehicle (UAV);
moving a plurality of walls of the mobile calibration system from a stowed position to a deployed position to form a mobile calibration room;
receiving a UAV on a turntable, the turntable disposed in the mobile calibration room; and
rotating the UAV about a first axis of rotation with the turntable to rotate at least one sensor on the UAV past a plurality of targets disposed in the mobile calibration room to calibrate the at least one sensor on the UAV.

15. The method of claim 14, wherein the plurality of walls of the mobile calibration system comprise a flexible material; and
wherein moving four walls of the mobile calibration system from a stowed position to a deployed position to form a mobile calibration room comprises:
moving a roof panel from a first position proximate a floor of the mobile calibration system to a second position distal the floor to unfurl the four walls of the mobile calibration system.

16. The method of claim 14, wherein the plurality of walls of the mobile calibration system comprise a rigid material; and
wherein moving four walls of the mobile calibration system from a stowed position to a deployed position to form a mobile calibration room comprises:
unfolding the four walls from a first position proximate a floor of the mobile calibration system to a second position approximately 90 degrees from the first position.

17. The method of claim 14, further comprising:
rotating the UAV about a second axis of rotation with a frame located on the turntable to rotate at least one sensor on the UAV past a plurality of targets disposed in the mobile calibration room to calibrate the at least one sensor on the UAV.

18. The method of claim 17, wherein rotating the UAV about the second axis of rotation with the frame located on the turntable further comprises rotating the UAV into a first position to place at least one target of the plurality of targets in a field of view of a side-looking camera and a downward-looking camera on the UAV at the same time.

19. The method of claim 14, further comprising:
rotating the turntable about a second axis of rotation with a cradle located proximate the turntable to rotate at least one sensor on the UAV past a plurality of targets disposed in the mobile calibration room to calibrate the at least one sensor on the UAV.

20. The method of claim 14, further comprising:
moving the plurality of walls of the mobile calibration system from the deployed position to the stowed position; and
positioning a mobile calibration system in a second location to calibrate at least one sensor on at least one other UAV.

* * * * *